US012605788B2

(12) United States Patent
Aikawa et al.

(10) Patent No.: US 12,605,788 B2
(45) Date of Patent: Apr. 21, 2026

(54) LASER MACHINING DEVICE, WAFER PROCESSING SYSTEM, AND METHOD FOR CONTROLLING LASER MACHINING DEVICE

(71) Applicant: Tokyo Seimitsu Co., Ltd., Tokyo (JP)

(72) Inventors: Chikara Aikawa, Tokyo (JP); Satoru Iwaki, Tokyo (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 742 days.

(21) Appl. No.: 18/096,909

(22) Filed: Jan. 13, 2023

(65) Prior Publication Data

US 2023/0150054 A1      May 18, 2023

Related U.S. Application Data

(63) Continuation of application No. PCT/JP2021/025179, filed on Jul. 2, 2021.

(30) Foreign Application Priority Data

Jul. 14, 2020      (JP) ................................. 2020-120672

(51) Int. Cl.
*B23K 26/03* (2006.01)
*B23K 26/364* (2014.01)
*B23K 26/70* (2014.01)

(52) U.S. Cl.
CPC .......... *B23K 26/032* (2013.01); *B23K 26/364* (2015.10); *B23K 26/705* (2015.10)

(58) Field of Classification Search
CPC .. B23K 26/032; B23K 26/364; B23K 26/705; B23K 26/0823; B23K 26/0861;
(Continued)

(56) References Cited

U.S. PATENT DOCUMENTS

| | | | |
|---|---|---|---|
| 5,968,382 A | 10/1999 | Matsumoto et al. | |
| 2001/0002287 A1* | 5/2001 | Kar ......................... | B22F 12/41 |
| | | | 427/205 |

(Continued)

FOREIGN PATENT DOCUMENTS

| | | |
|---|---|---|
| CN | 101107501 A | 1/2008 |
| CN | 103252583 A | 8/2013 |

(Continued)

OTHER PUBLICATIONS

JP2005230903A Translation (Year: 2025).*

(Continued)

*Primary Examiner* — Elizabeth M Kerr
*Assistant Examiner* — Keith Brian Assante
(74) *Attorney, Agent, or Firm* — Birch, Stewart, Kolasch & Birch, LLP

(57)      ABSTRACT

The laser machining device includes an observation image acquiring unit configured to repeatedly acquire an observation image of a machining spot of laser light emitted from a laser optical system to a street on a wafer while a machined groove is being formed, a luminance detector configured to detect a luminance of a plasma generated at the machining spot by emission of the laser light based on the observation image every time the observation image acquiring unit acquires the observation image, a correspondence information obtaining unit configured to obtain correspondence information indicating a correspondence relationship among the luminance, energy of the laser light and a machined state of the machined groove, and a machined state assessing unit configured to assess the machined state with reference to the correspondence information based on the luminance and known energy of the laser light every time the luminance detector detects the luminance.

9 Claims, 17 Drawing Sheets

(58) Field of Classification Search
CPC ............ B23K 2101/40; B23K 2103/50; B23K 26/0622; B23K 26/402; B23K 26/702; B23K 26/03; H01L 21/30; H01L 21/67092
See application file for complete search history.

(56)                      References Cited

U.S. PATENT DOCUMENTS

| | | | |
|---|---|---|---|
| 2003/0003179 A1* | 1/2003 | Farnworth ............ | B29C 64/135 264/401 |
| 2006/0042436 A1* | 3/2006 | Closmann ............. | B23P 15/406 29/895 |
| 2006/0105544 A1 | 5/2006 | Takanashi et al. | |
| 2009/0165126 A1* | 6/2009 | Jung ...................... | G06Q 10/06 726/21 |
| 2009/0191693 A1 | 7/2009 | Iizuka | |
| 2013/0213946 A1 | 8/2013 | Morikazu | |
| 2017/0358442 A1 | 12/2017 | Hosoda et al. | |
| 2019/0262936 A1 | 8/2019 | Kobayashi et al. | |
| 2020/0130107 A1 | 4/2020 | Mochizuki et al. | |

FOREIGN PATENT DOCUMENTS

| | | | |
|---|---|---|---|
| JP | 9-29472 A | | 2/1997 |
| JP | 2003-285189 A | | 10/2003 |
| JP | 2005230903 A | * | 9/2005 |
| JP | 2006-140311 A | | 6/2006 |
| JP | 2007-284288 A | | 11/2007 |
| JP | 2009-182019 A | | 8/2009 |
| JP | 2013-169556 A | | 9/2013 |
| JP | 2013-173160 A | | 9/2013 |
| JP | 2014-130910 A | | 7/2014 |
| JP | 2018-146391 A | | 9/2018 |
| JP | 2019-141902 A | | 8/2019 |
| JP | 2020-69492 A | | 5/2020 |
| TW | 201431005 A | | 8/2014 |
| WO | WO 2006/093264 A1 | | 9/2006 |

OTHER PUBLICATIONS

Japanese Office Action for counterpart Japanese Application No. 2020-120672, dated Aug. 14, 2024, with English translation.
Korean Notice of Allowance for corresponding Korean Application No. 10-2023-7001368, dated Apr. 12, 2024, with an English translation.
International Search Report for PCT/JP2021/025179 (PCT/ISA/210) mailed on Sep. 14, 2021.
Taiwanese Office Action for Application No. 110125616 mailed on Nov. 2, 2022.
Written Opinion of the International Searching Authority for PCT/JP2021/025179 (PCT/ISA/237) mailed on Sep. 14, 2021.
Chinese Office Action and Search Report for Chinese Application No. 202180061355.X, dated Feb. 2, 2026, with English translation.
Guo et al., "Metal Technology," Higher Education Publishers, 2nd Edition, Jan. 2004, pp. 63-64 (5 pages total).
Yu et al., "Laser Manufacturing Technology," Defense Industry Press, Jan. 2012, pp. 265-266 (5 pages total).
Zuo et al., "Laser Processing of High-Strength Aluminum Alloys," Defense Industry Press, 2nd Edition, May 2008, pp. 278-279 (5 pages total).

* cited by examiner

FIG.10

| STREET | X DIRECTION POSITION | PLASMA LUMINANCE | ENERGY | GROOVE SHAPE |
|---|---|---|---|---|
| No1 | X1 | LU1 | LU1 | DP1 |
| No1 | X2 | LU2 | LU2 | DP2 |
| No1 | X3 | LU3 | LU3 | DP3 |
| ⋮ | ⋮ | ⋮ | ⋮ | ⋮ |
| No2 | ⋮ | ⋮ | ⋮ | ⋮ |
| ⋮ | ⋮ | ⋮ | ⋮ | ⋮ |

LASER MACHINING DEVICE, WAFER PROCESSING SYSTEM, AND METHOD FOR CONTROLLING LASER MACHINING DEVICE

CROSS-REFERENCE TO RELATED APPLICATIONS

The present application is a Continuation of PCT International Application No. PCT/JP2021/025179 filed on Jul. 2, 2021 claiming priority under 35 U.S.C § 119(a) to Japanese Patent Application No. 2020-120672 filed on Jul. 14, 2020. Each of the above applications is hereby expressly incorporated by reference, in their entirety, into the present application.

BACKGROUND OF THE INVENTION

Field of the Invention

The presently disclosed subject matter relates to a laser machining device, a wafer processing system, and a method for controlling a laser machining device.

Description of the Related Art

In the field of semiconductor device manufacturing in recent years, a wafer (semiconductor wafer) has been known which forms a plurality of devices with a laminate in which a low-dielectric constant film (Low-k film) including a vitreous material and a functional film forming a circuit are stacked on a surface of a substrate made of, for example, silicon. With respect to such a wafer, a plurality of devices are partitioned into a grid pattern by streets arranged in a grid, and each of the devices is produced by dividing the wafer along the streets.

As a method for dividing a wafer into a plurality of devices (chips), a method using a fast-rotating blade and a method that forms laser machined regions along streets in an internal part of a wafer and applies an external force along the streets having a strength reduced by the formed laser machined regions have been known. However, in a case of a wafer including a Low-k film, since a raw material of the Low-k film and a raw material of the wafer are different, it is difficult to cut the Low-k film and the substrate simultaneously with the blade according to the former method. Also, in the latter method, it is difficult to divide the wafer into individual devices in good quality when a Low-k film exists on the streets.

Accordingly, PTL 1 and PTL 2 disclose a laser machining device which forms a machining groove by relatively moving a laser optical system to a wafer in a machining feed direction along a street and emitting laser light from the laser optical system to the street. With the laser machining device, a machined groove is formed along a street so that a Low-k film and so on can be removed from the top of the street.

CITATION LIST

PTL 1: Japanese Patent Application Laid-Open No. 2009-182019

PTL 2: Japanese Patent Application Laid-Open No. 2006-140311

SUMMARY OF THE INVENTION

However, in a case where laser machining (ablation groove machining) is performed which forms a machined groove along a street by using the laser machining device disclosed in PTL 1, it is desirable to check a machined state of the machined groove in real time. In this case, performing observation on a machining spot of laser light by using a microscope (camera) provided in the laser machining device may be considered, but information on the machined groove acquired from the surface observation using the microscope is limited. For that reason, in the past, checking a machined state of a machined groove in real time was not possible, and it was necessary to cut a wafer after laser machining and check the machined state of the wafer.

The presently disclosed subject matter was made in view of such a circumstance, and it is an object of the presently disclosed subject matter to provide a laser machining device, a wafer processing system, and a method for controlling a laser machining device by which a machined state of a machined groove can be checked in real time.

A laser machining device for achieving the object of the presently disclosed subject matter is a laser machining device forming a machined groove along a street on a wafer by relatively moving a laser optical system in a machining feed direction along the street and emitting laser light from the laser optical system to the street, the laser machining device including an observation image acquiring unit configured to repeatedly acquire an observation image of a machining spot of the laser light emitted from the laser optical system to the street while the machined groove is being formed, a luminance detector configured to detect a luminance of a plasma generated at the machining spot by emission of the laser light based on the observation image every time the observation image acquiring unit acquires the observation image, a correspondence information obtaining unit configured to obtain correspondence information indicating a correspondence relationship among the luminance, energy of the laser light and a machined state of the machined groove, and a machined state assessing unit configured to assess the machined state with reference to the correspondence information based on the luminance and known energy of the laser light every time the luminance detector detects the luminance.

With this laser machining device, based on a result of the detection of a luminance of a plasma at each machining spot, a machined state of laser machining at the machining spot can be assessed in real time.

In the laser machining device according to another aspect of the presently disclosed subject matter, the observation image acquiring unit includes an optical element configured to block light in a wavelength band of the laser light, and an observation optical system configured to image the machining spot through the optical element. Thus, since an influence (noise) of scattered light of the laser light included in a result of the detection of a luminance of the plasma can be suppressed, the assessment of a machined state of the machined groove at each machining spot can be performed with higher precision.

In the laser machining device according to another aspect of the presently disclosed subject matter, the correspondence information obtaining unit obtains the correspondence information indicating the correspondence relationship among the luminance, energy of the laser light, and the machined states including a depth of the machined groove and a temperature at the machining spot. Thus, the machined states (a depth of a machined groove and a temperature at a machining spot) of laser machining at each machining spot can be assessed in real time.

In the laser machining device according to another aspect of the presently disclosed subject matter, the laser optical system is configured to form the machined groove selectively under a plurality of machining conditions in which at least one of a depth position of the machining spot from a surface of the wafer and a removed amount of a substance caused by the forming of the machined groove is different, the laser machining device further includes a machining condition selecting unit configured to select the machining condition, and the correspondence information obtaining unit obtains the correspondence information corresponding to the machining condition selected by the machining condition selecting unit from a plurality of pieces of the correspondence information corresponding to the plurality of machining conditions. Thus, since a machined state of a machined groove can be assessed for each machining condition, the machined state of the machined groove can be more precisely assessed.

In the laser machining device according to another aspect of the presently disclosed subject matter, when a plurality of regions having different materials from each other exist along the street, the correspondence information obtaining unit obtains a plurality of pieces of the correspondence information corresponding to the material for each of the regions, the laser machining device further includes a positional information acquiring unit configured to acquire positional information on the machining spot, and the machined state assessing unit assesses the machined state by using the correspondence information corresponding to the material at a position of the machining spot based on the positional information acquired by the positional information acquiring unit and known design information on the wafer. Thus, the machined state of the machined groove can be more precisely assessed even when a plurality of regions having different materials exist on the surface of the street.

The laser machining device according to another aspect of the presently disclosed subject matter further includes a laser machining controller that, while the forming of the machined groove is being performed, the laser machining controller configured to control the energy of the laser light emitted by the laser optical system based on a result of assessment by the machined state assessing unit so as to maintain the machined state constant. Thus, quality of machining on the machined groove can be improved.

A wafer processing system for achieving the object of the presently disclosed subject matter includes the aforementioned laser machining devices and a server including a storage configured to store the correspondence information, and the correspondence information obtaining unit obtains the correspondence information from the storage.

In the wafer processing system according to another aspect of the presently disclosed subject matter, at least one of the laser machining devices includes a groove shape acquiring unit configured to acquire a groove shape including at least a depth of the machined groove formed at the machining spot for each of the machining spots along the street, and an actual measurement information output unit configured to output actual measurement information on the luminance and the groove shape at each of the machining spots to the server based on a detection result from the luminance detector and an acquisition result from the groove shape acquiring unit, and the server includes a correspondence information generating unit configured to generate the correspondence information and store the correspondence information in the storage based on the actual measurement information output from the actual measurement information output unit. Thus, laser machining (monitoring of a machined state) on a new wafer W can be addressed easily.

In a method for controlling a laser machining device for achieving the object of the presently disclosed subject matter configured to form a machined groove along a street on a wafer by relatively moving a laser optical system in a machining feed direction along the street and emitting laser light from the laser optical system to the street, the method includes an observation image acquiring step of repeatedly acquiring an observation image of a machining spot of the laser light emitted from the laser optical system to the street while the machined groove is being formed, a luminance detecting step of detecting a luminance of a plasma generated at the machining spot by emission of the laser light based on the observation image every time the observation image acquiring step acquires the observation image, a correspondence information obtaining step of obtaining correspondence information indicating a correspondence relationship among the luminance, energy of the laser light and a machined state of the machined groove, and a machined state assessing step of assessing the machined state with reference to the correspondence information based on the luminance and known energy of the laser light every time the luminance is detected in the luminance detecting step.

According to the presently disclosed subject matter, a machined state of a machined groove can be checked in real time.

BRIEF DESCRIPTION OF THE DRAWINGS

FIG. 10 is a functional block diagram of a controller in a laser machining device according to a third embodiment;

5

Figure 17:
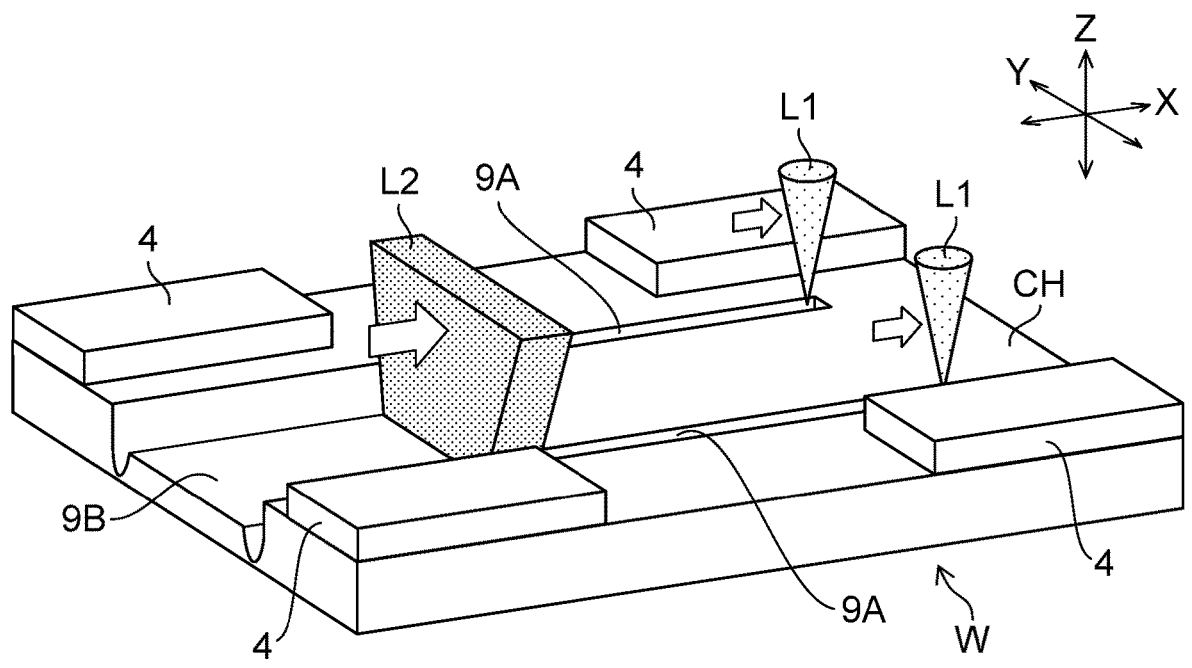

FIG. 17 is an explanatory diagram for explaining forming of two edge-cutting grooves and a hollow groove along a street by the laser machining device.

DESCRIPTION OF THE EMBODIMENTS (Configuration of Laser Machining Device According to First Embodiment)

Figure 1:
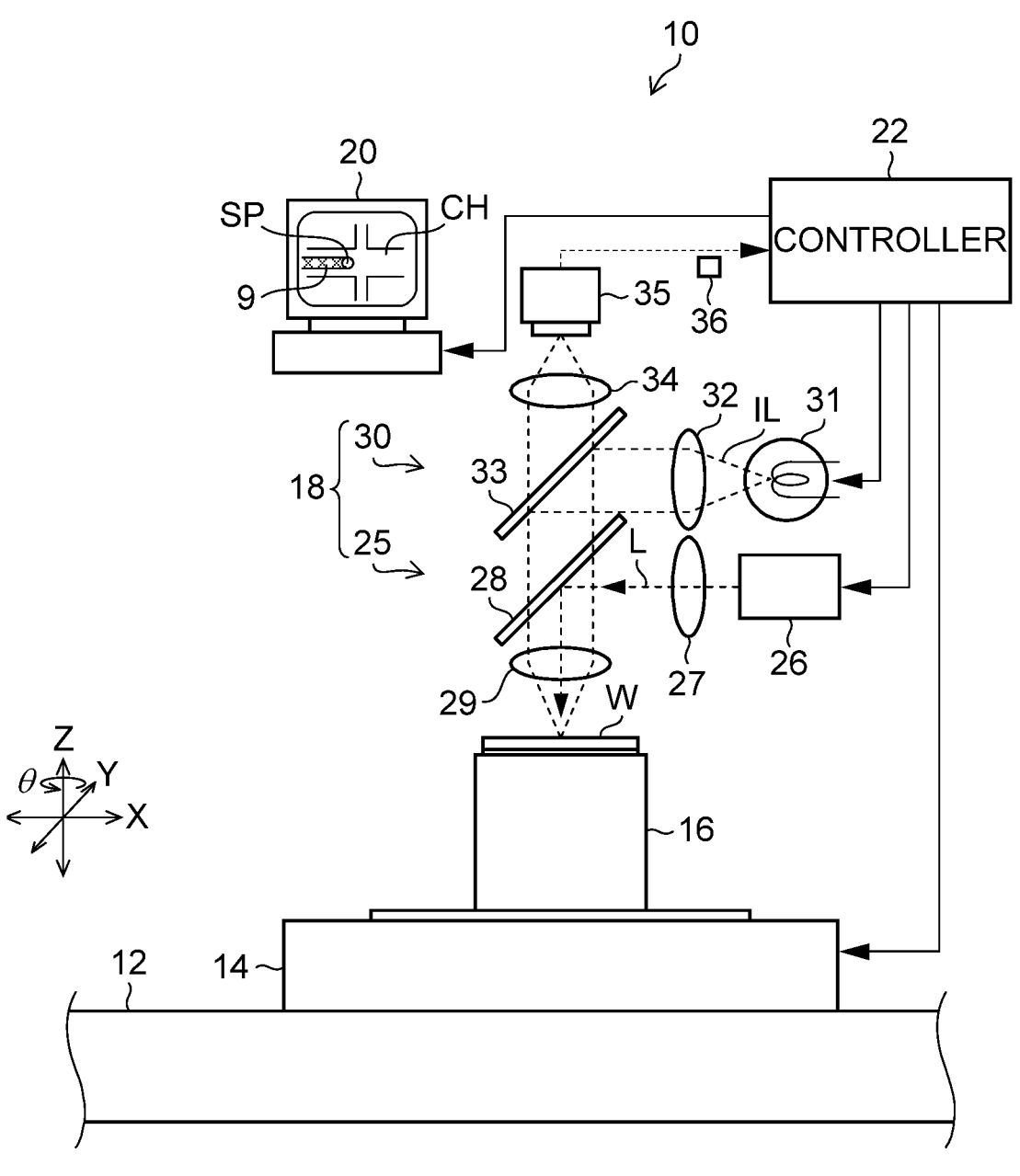
FIG. 1 is a schematic diagram of a laser machining device according to a first embodiment.

FIG. 1 is a schematic diagram of a laser machining device 10 according to a first embodiment. As illustrated in FIG. 1, the laser machining device 10 performs laser machining (ablation groove machining) on a wafer W (such as a silicon wafer) as a preceding step of a cutting process for dividing the wafer W into a plurality of chips 4 (see FIG. 2). X, Y and Z directions in the figures are orthogonal to each other, and, among them, the X direction and the Y direction are horizontal directions, and the Z direction is a vertical direction (direction of thickness of the wafer W). Also, the θ direction is a direction of rotation about the Z direction as a rotation axis.

Figure 2:
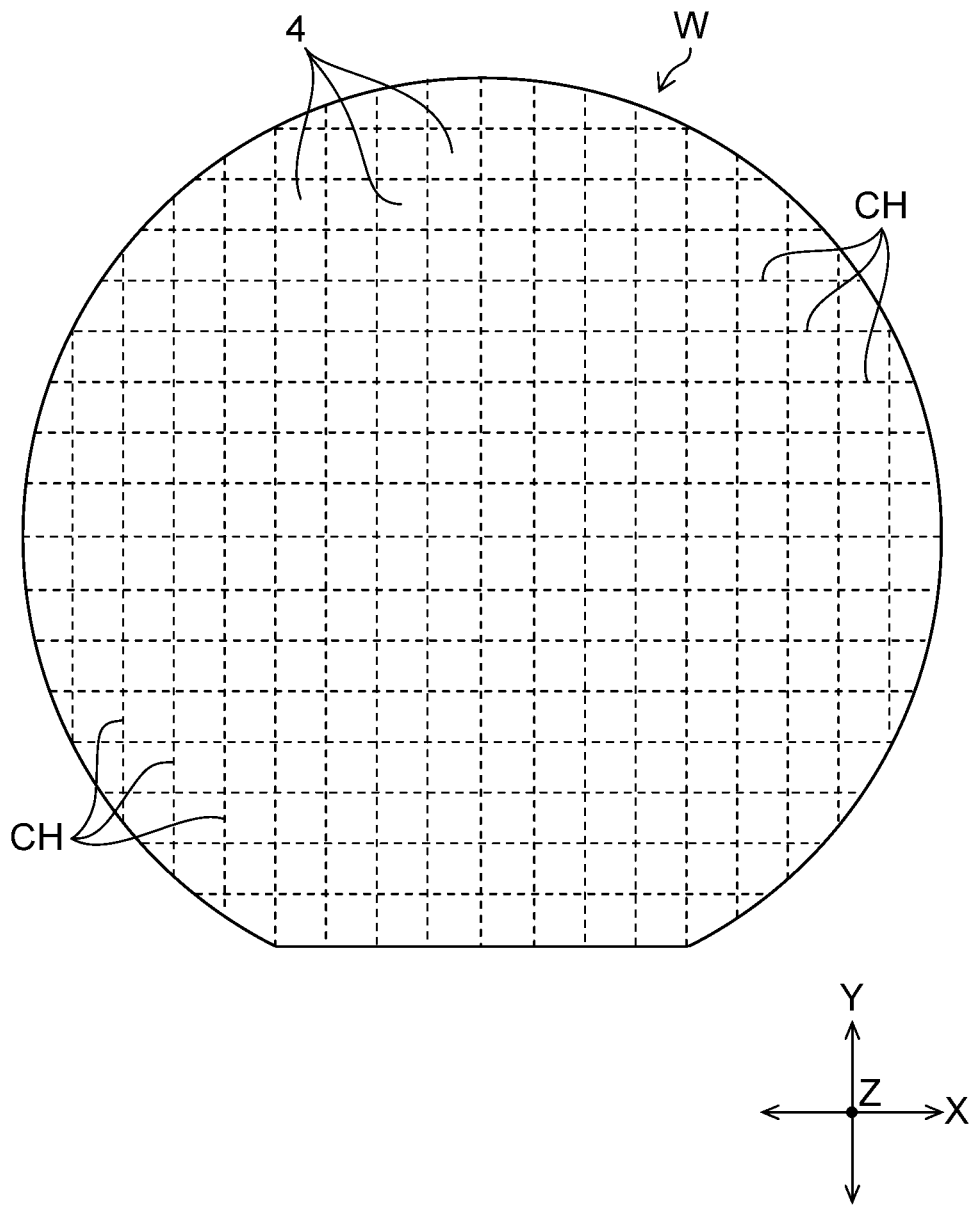
FIG. 2 is a plan view of a wafer to be machined by the laser machining device.

FIG. 2 is a plan view of the wafer W to be machined by the laser machining device 10. As illustrated in FIG. 2, the wafer W is a laminate in which a Low-k film and a functional film forming a circuit are stacked on a surface of a substrate made of, for example, silicon. The wafer W is partitioned into a plurality of regions by a plurality of streets CH (which may also be referred to as planned dividing lines) arranged in a grid pattern. A chip 4 (device) is provided in each of the partitioned regions. For each street CH, the laser machining device 10 removes a Low-k film and the like on a street CH and forms a machined groove 9 (which may also be referred to as an ablation groove or a laser groove) by performing laser machining along the street CH.

Referring back to FIG. 1, the laser machining device 10 includes a base 12, a XYZθ stage 14, an absorbing stage 16, a machining unit 18, a monitor 20, and a controller 22.

The XYZθ stage 14 is provided on the base 12. The XYZθ stage 14 is provided movably in the X, Y and Z directions and rotatably in the θ direction on the base 12. This XYZθ stage 14 is moved in the X, Y and Z directions by a movement mechanism 24 (see FIG. 3) configured by an actuator, a motor and so on and is rotated in the θ direction.

The absorbing stage 16 is provided on the XYZθ stage 14. The absorbing stage 16 absorbs and holds a back surface of the wafer W. Thus, the wafer W is held on the XYZO stage 14 such that a surface having the aforementioned Low-k film and so on of the wafer W faces the machining unit 18, which will be described below. When the movement mechanism 24 moves the XYZθ stage 14 in the X, Y, Z, θ direction, the machining unit 18 is thus relatively moved in the X, Y, Z, θ direction with respect to the wafer W on the absorbing stage 16.

The machining unit 18 includes a laser optical system 25 and an observation optical system 30. This machining unit 18 is located at a position on the upper side in the Z direction of the absorbing stage 16 (at a position facing the wafer W) and is controlled by the controller 22, which will be described below.

The laser optical system 25 emits laser light L toward a street CH on the wafer W. This laser optical system 25 includes a laser light source 26 (laser oscillator), a collimating lens 27, a half mirror 28, and a condenser lens 29 (condensing lens).

The laser light source 26 emits laser light L (such as pulsed laser light, for example) toward the collimating lens 27. Conditions for the laser light L include, for example, a light source of ultraviolet ray (UV)-pulsed laser, a wavelength of 400 nm or lower, a cyclic frequency of 1 to 100 kHz, and an average output of 0.5 to 10 watts but are not particularly limited to the conditions.

After the laser light L entering from the laser light source 26 to the collimating lens 27 is converted to parallel luminous fluxes, the collimating lens 27 emits this laser light L toward the half mirror 28.

The half mirror 28 is located on an optical axis of the condenser lens 29 and reflects a part of the laser light L entering from the collimating lens 27 toward the condenser lens 29. Also, the half mirror 28 allows a part of illuminating light IL, which will be described below, entering from a half mirror 33, which will be described below, to pass through and emits the part of illuminating light IL toward the condenser lens 29, and allows a part of the reflected light of the illuminating light IL entering from the condenser lens 29 to pass through and emits the part of the reflected light toward the half mirror 33.

The condenser lens 29 condenses the laser light L and illuminating light IL entering from the half mirror 28 onto a street CH on the wafer W.

The observation optical system 30 is provided coaxially with the laser optical system 25 and images an alignment reference, which will be described below, formed on the wafer W before laser machining is performed on the wafer W. Also, during the laser machining on the streets CH on the wafer W, the observation optical system 30 images a machining spot SP thereof.

The observation optical system 30 shares the half mirror 28 and the condenser lens 29 with the laser optical system 25 and includes an illuminating light source 31, the collimating lens 32, a half mirror 33, a condenser lens 34, a microscope 35, and so on.

The illuminating light source 31 emits illuminating light IL in a wavelength band of, for example, visible light (or a wavelength band of infra-red light or near infra-red light is also possible) toward the collimating lens 32.

After the illuminating light IL entering from the illuminating light source 31 to the collimating lens 32 is converted to parallel luminous fluxes, the collimating lens 32 emits this illuminating light IL toward the half mirror 33.

The half mirror 33 is located on an optical axis of the condenser lens 29 and reflects a part of the illuminating light IL entering from the collimating lens 32 toward the half mirror 28. Thus, the illuminating light IL is condensed onto the surface of the wafer W through the half mirror 28 and the condenser lens 29. The half mirror 33 allows a part of reflected light of the illuminating light IL entering after reflected from the wafer W through the condenser lens 29 and the half mirror 28 to pass through and emits the part of the reflected light toward the condenser lens 34.

The condenser lens 34 condenses the reflected light of the illuminating light IL entering from the half mirror 33 onto the microscope 35.

The microscope 35 includes a so-called digital camera and includes an imaging device (not illustrated) having sensitivity to all wavelength bands of the illuminating light IL and a plasma 60 (see FIG. 4), which will be described below. The microscope 35 images the reflected light of the illuminating light IL condensed by the condenser lens 34 and outputs an observation image 36 (imaged image data) of each part of the wafer W to the controller 22. Based on the observation image 36 acquired by imaging the wafer W by using the microscope 35 with the condenser lens 29 focused at a machining spot SP (focal point, spot) of the laser light L condensed onto a street CH thereon, a state of the laser machining on the wafer W can be checked. Furthermore, according to this embodiment, based on the observation image 36 of the machining spot SP, machined states of a machined groove 9 are assessed including a depth of the machined groove 9 and a temperature at the machining spot SP, which will be described in detail below. Still further, before laser machining on the wafer W, alignment detection can be performed based on an observation image 36 acquired by imaging the wafer W by using the microscope 35 with the condenser lens 29 focused at the alignment reference on the surface of the wafer W.

The controller 22 generally controls operations of components of the laser machining device 10 such as the movement mechanism 24, the laser optical system 25, and the observation optical system 30 and performs alignment of the machining unit 18, laser machining for each street CH, acquisition of an observation image 36 of a machining spot SP, assessment of a machined state of the machined groove 9, and so on.

(Configuration of Controller)

Figure 3:
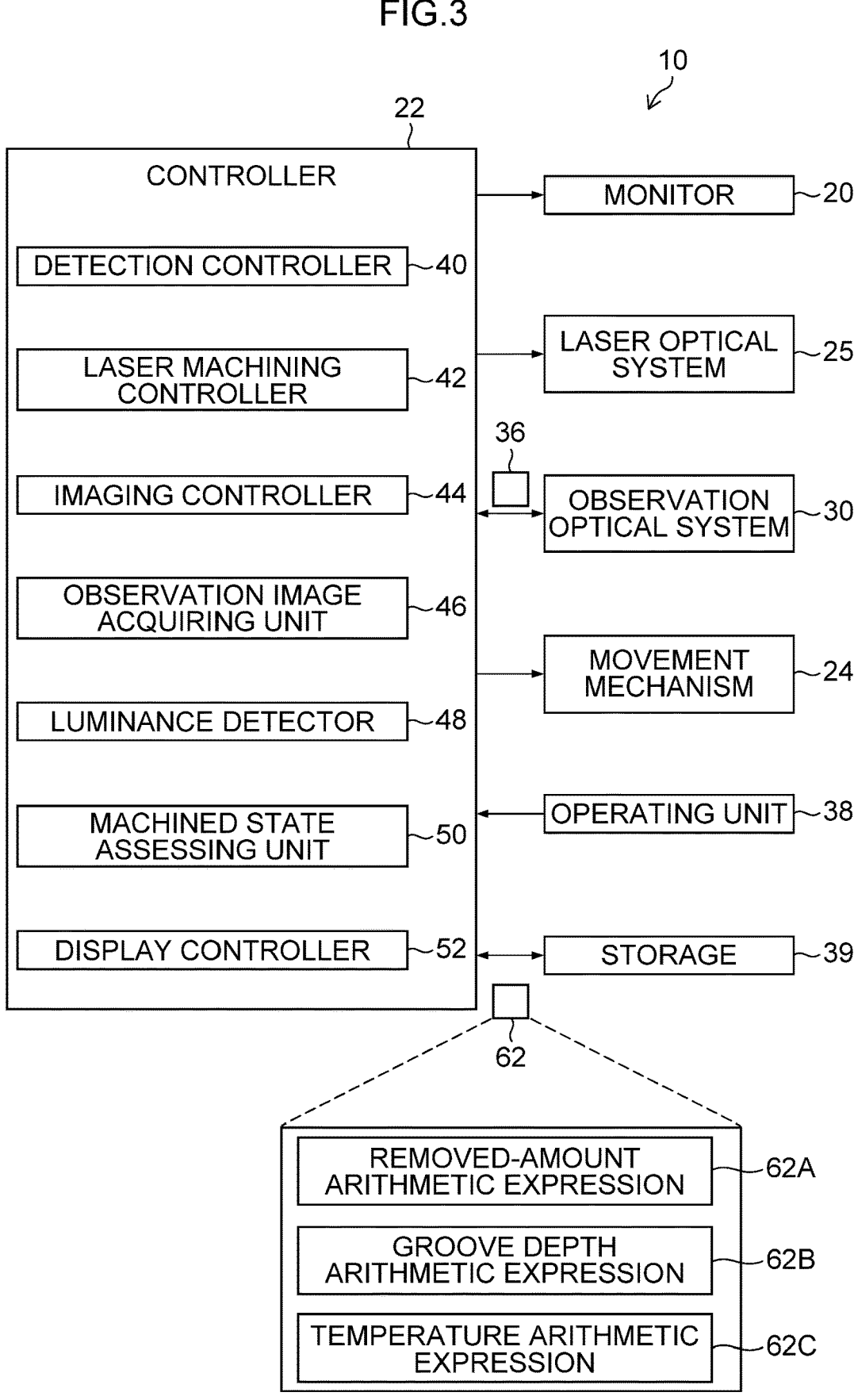
FIG. 3 is a functional block diagram of a controller according to the first embodiment.

FIG. 3 is a functional block diagram of the controller 22 according to the first embodiment. As illustrated in FIG. 3, an operating unit 38 and a storage 39, in addition to the aforementioned monitor 20, movement mechanism 24, laser optical system 25, and observation optical system 30, are connected to the controller 22.

A keyboard, a mouse, an operation button and the like, which are publicly known, are used as the operating unit 38, and the operating unit 38 receives inputs of various kinds of operation by an operator.

The storage 39 stores a control program for the laser machining device 10, a result of assessment of a machined state of the machined groove 9 by the controller 22, and so on, though not illustrated in the figure. The storage 39 further pre-stores correspondence information 62 to be used for assessment of a machined state of the machined groove 9 by the controller 22, which will be described in detail below.

The controller 22 is configured by an arithmetical unit such as a personal computer, for example, and includes an arithmetic circuit configured by various kinds of processors, a memory, and so on. The various kinds of processors include a central processing unit (CPU), a graphics processing unit (GPU), an application specific integrated circuit (ASIC), a programmable logic device (such as simple programmable logic devices (SPLD), complex programmable logic device (CPLD), and field programmable gate arrays (FPGA)) and so on. Various kinds of functions of the controller 22 may be implemented by one processor or may be implemented by a plurality of processors of the same kind or of different kinds.

The controller 22 executes a control program, not illustrated, read out from the storage 39 to function as a detection controller 40, a laser machining controller 42, an imaging controller 44, an observation image acquiring unit 46, a luminance detector 48, a machined state assessing unit 50, and a display controller 52. Hereinafter, a term "-unit" in the description of the embodiments may refer to "-circuit", "-device", or "-apparatus". In other words, each of those described as "-unit" may be configured by any of firmware, software, and hardware or a combination thereof.

The detection controller 40 controls components of the laser machining device 10 and performs alignment detection which detects a position (including an orientation within an XY plane) of each street CH on the wafer W held on the absorbing stage 16.

First, the detection controller 40 controls the movement mechanism 24 and the observation optical system 30 and acquires (takes) an observation image 36 of an alignment reference on the wafer W. The term "alignment reference" here refers to a reference to be used for recognizing a position of a street CH on the wafer W by the laser machining device 10, and a publicly known reference may be used such as a street CH, an alignment mark (not illustrated in the figure) and the like, for example. The alignment reference may be provided at an arbitrary position on an internal part, a front surface, a back surface or the like of the wafer W if the alignment reference can be imaged by the microscope 35.

In order to acquire an observation image 36 of an alignment reference, the detection controller 40 drives the movement mechanism 24 and thus relatively moves an optical axis of the condenser lens 29 to a position where the alignment reference on the wafer W can be imaged by the observation optical system 30. After the movement, the detection controller 40 causes the microscope 35 to execute imaging of the wafer W including the alignment reference. Thus, an observation image 36 of the alignment reference of the wafer W is acquired by the microscope 35, and the observation image 36 is output from the microscope 35 to the detection controller 40.

Based on an observation image 36 of an alignment reference input from the microscope 35, the detection controller 40 detects a position of each street CH on the wafer W by detecting the alignment reference within the observation image according to a publicly known image recognition method.

The laser machining controller 42 controls the movement mechanism 24 and the laser optical system 25 and, for each street CH, executes laser machining that forms a machined groove 9 along the street CH.

More specifically, based on a result of alignment detection by the detection controller 40, the laser machining controller 42 drives the movement mechanism 24 and rotates the XYZθ stage 14 in the θ direction so as to make the street CH to be processed parallel with the X direction (machining feed direction). Next, based on a result of the alignment detection by the detection controller 40, the laser machining controller 42 drives the movement mechanism 24 and adjusts the position of the XYZθ stage 14 so as to execute alignment for positioning the optical axis of the condenser lens 29 at one end of the streets CH to be processed.

Figure 4:
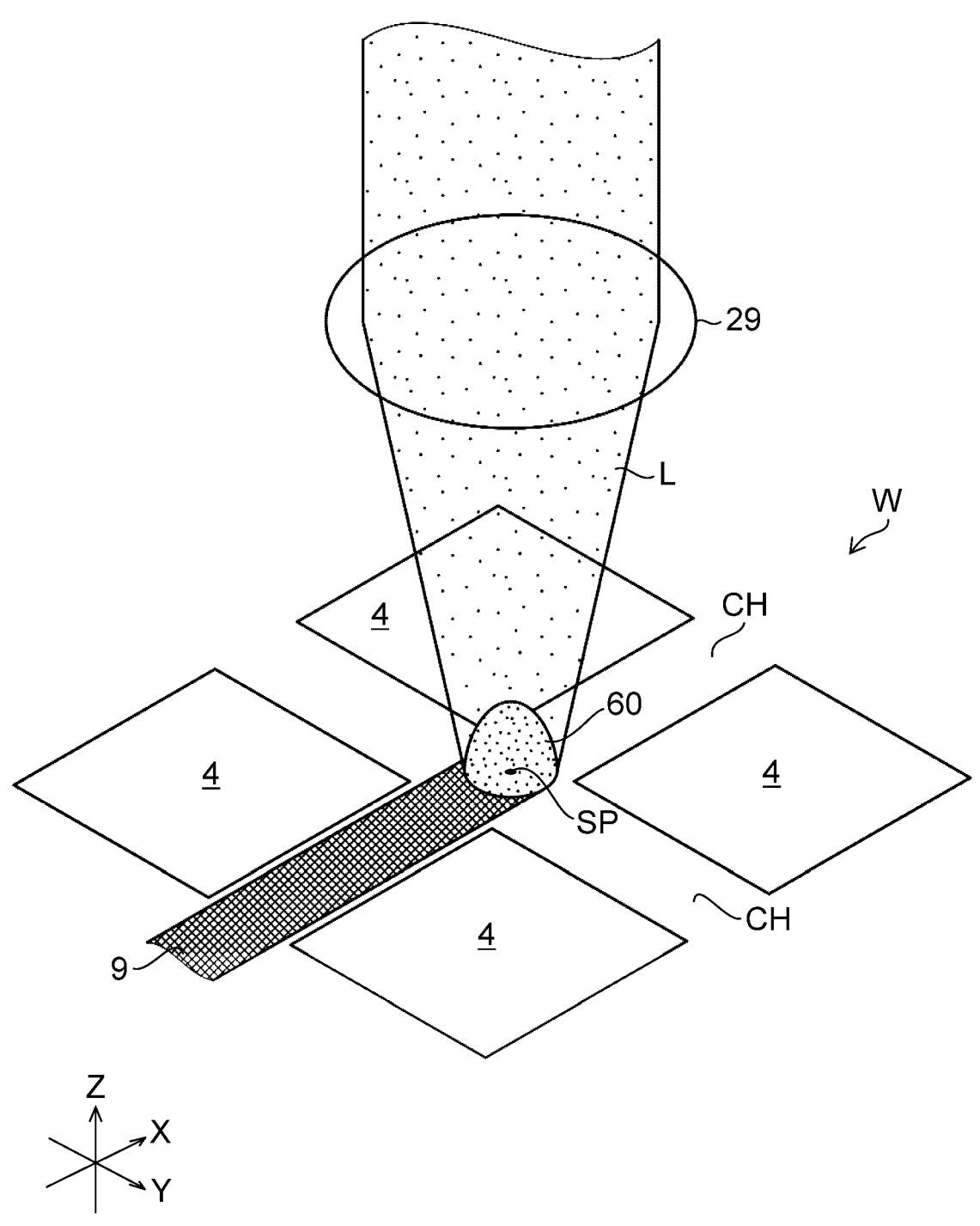
FIG. 4 is an explanatory diagram for explaining forming of a machined groove along a street.
Figure 5:
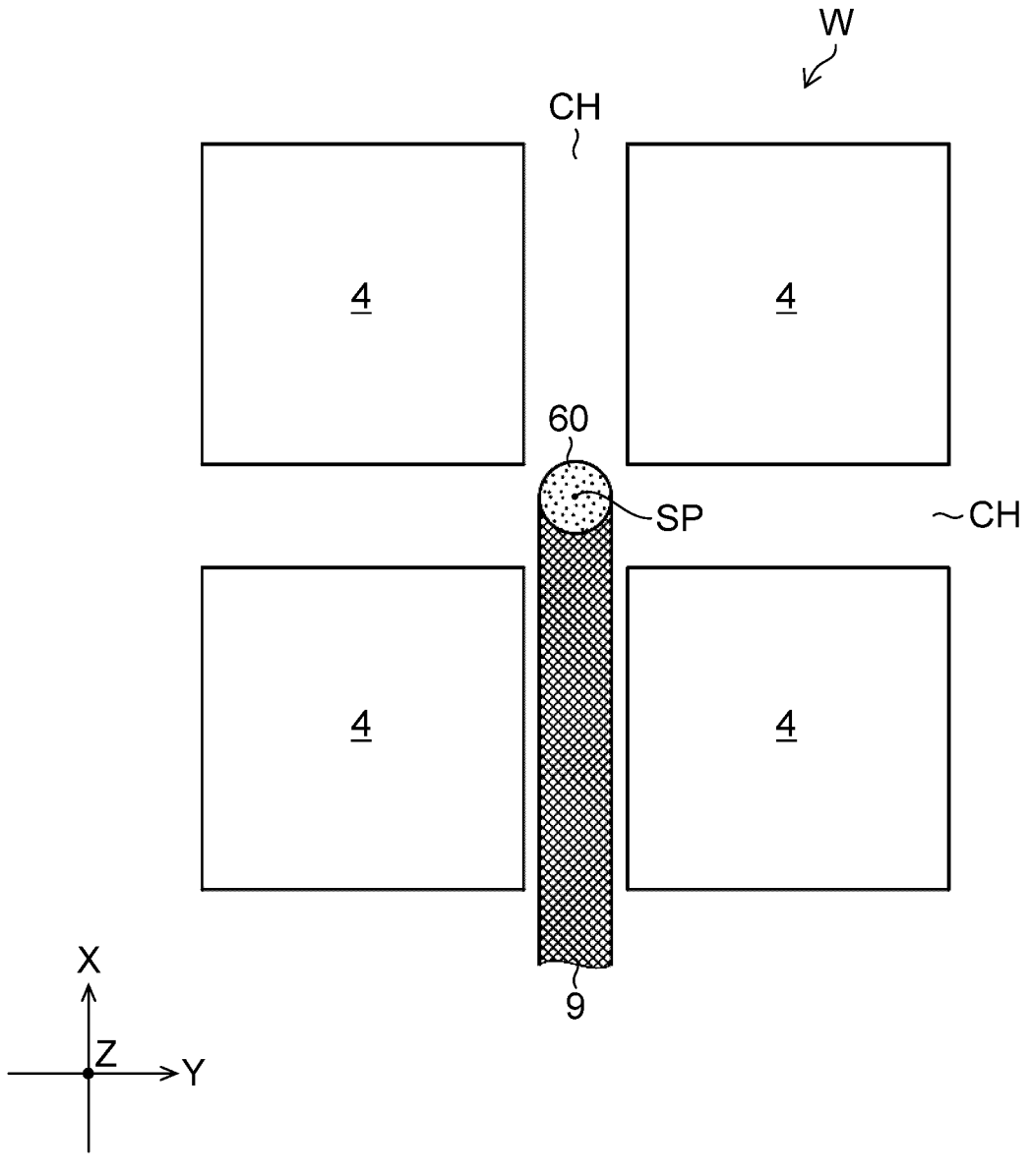
FIG. 5 is an explanatory diagram for explaining forming of a machined groove along a street.

FIGS. 4 and 5 are explanatory diagrams for explaining forming of a machined groove 9 along a street CH. As illustrated in FIGS. 4 and 5, after completion of the aforementioned alignment, the laser machining controller 42 controls the laser optical system 25 so as to condense laser light L onto a street CH to be processed on the wafer W, and a machined groove 9 is thus formed at a machining spot SP for the laser light L.

Next, the laser machining controller 42 drives the movement mechanism 24 to move the XYZθ stage 14 in the X direction. Thus, while laser light L is being condensed onto a street CH, the laser optical system 25 is relatively moved in the X direction with respect to the wafer W, that is, the laser optical system 25 is relatively moved in the X direction along the first street CH with respect to the wafer W. As a result, a machined groove 9 is formed along the street CH to be processed.

At that time, a so-called plasma state is brought which is a state that a surface layer (a Low-k film or the like) of the street CH is melt and vaporized by heat of the laser light L and is thus ionized so that a plasma 60 occurs at the machining spot SP for the laser light L.

The plasma 60 has a luminance varying in accordance with a removed amount of a substance such as a Low-k film or the like to be removed (brought into a plasma state) from the street CH (or a depth of the machined groove 9) with one shot of laser light L being pulsed laser. Then, the removed amount of the substance with one shot is correlated with energy (J) of the laser light L. Therefore, there is a correlation among the luminance of the plasma 60 at each machining spot SP, the removed amount of the substance (depth of the machined groove 9), and the energy of the laser light L.

A spot diameter of laser light L (at a machining spot SP), the depth position (position in the Z direction) of the machining spot SP from the surface of the wafer W, and a material of the street CH also affect in addition to the energy of the laser light L, but the first embodiment is described on assumption that they are fixed for avoiding complexity in the description.

Figure 6:
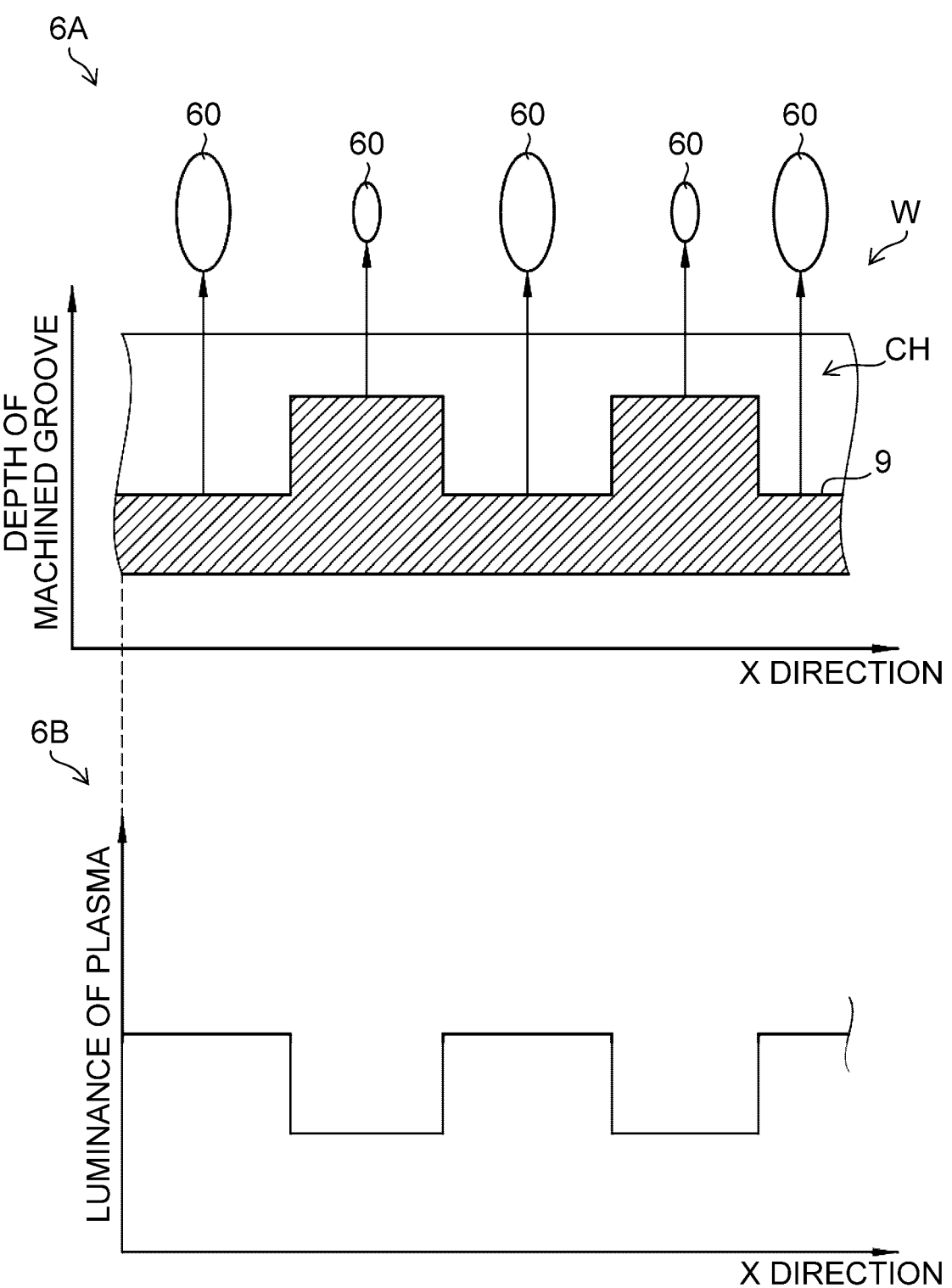
FIG. 6 is an explanatory diagram for explaining a relationship between a luminance of a plasma and a depth of a machined groove.

FIG. 6 is an explanatory diagram for explaining a relationship between a luminance (plasma luminance) of a plasma 60 and a depth of a machined groove 9. As indicated by reference sign 6A in FIG. 6, as the removed amount of a substance removed from a machining spot SP on a street CH increases, the luminance of the plasma 60 generated at the machining spot SP increases. Conversely, as the removed amount of a substance removed from a machining spot SP on a street CH decreases, the luminance of the plasma 60 generated at the machining spot SP decreases. Furthermore, by increasing or reducing the energy of the laser light L, the luminance of the plasma 60 and the removed amount of the substance at each machining spot SP vary. Therefore, the luminance of the plasma 60 and the energy of the laser light L at each machining spot SP acts as an index that indicates the removed amount of the substance at each machining spot SP, that is, the depth of the machined groove 9.

Therefore, according to this embodiment, correspondence information 62 (see FIG. 3), which will be described below, is acquired in advance which indicates a correspondence relationship among the luminance of the plasma 60, the energy of laser light L and the removed amount of a substance (depth of the machined groove 9). Thus, according to this embodiment, as indicated by reference sign 6B in FIG. 6, based on the luminance of the plasma 60 at each machining spot SP and known energy of laser light L along a street CH (in the X direction), the depth of the machined groove 9 at each machining spot SP is acquired with reference to the correspondence information 62. Also, based on the depth of the machined groove 9 at each machining spot SP along a street CH, a shape of a bottom surface of the entire machined groove 9 formed along the street CH can be acquired.

Furthermore, the luminance of the plasma 60 is also correlated with the temperature at the machining spot SP. Thus, by additionally acquiring in advance a correspondence relationship among the luminance of the plasma 60, the energy of the laser light L and the temperature at the machining spot SP as the aforementioned correspondence information 62, the depth of the machined groove 9 and the machining temperature for each machining spot SP can be acquired based on the luminance of the plasma 60 and known energy of the laser light L at each machining spot SP along a street CH.

Referring back to FIG. 3, while laser machining (forming a machined groove 9) is being performed by the laser optical system 25 on a street CH, the imaging controller 44 controls the observation optical system 30 so as to cause the microscope 35 to repeatedly perform imaging of the laser light L at the machining spot SP and output of an observation image 36 thereof. Since the laser light L of this embodiment is pulsed laser, the imaging controller 44 preferably performs the imaging the machining spot SP and outputting an observation image 36 in synchronization with an emission trigger for the laser light L. Thus, for each machining spot SP along a street CH, a real-time observation image 36 of the machining spot SP can be acquired.

While laser machining on a street CH (forming a machined groove 9) is being performed by the laser optical system 25, the observation image acquiring unit 46 functions as an interface connecting to the microscope 35. Every time the imaging of a machining spot SP is performed by the microscope 35, the observation image acquiring unit 46 repeatedly acquires an observation image 36 of a machining spot SP from the microscope 35 and outputs it to the luminance detector 48.

Every time an observation image 36 of a machining spot SP is input from the observation image acquiring unit 46, the luminance detector 48 detects the luminance of the plasma 60 generated at the machining spot SP based on the observation image 36.

First, the luminance detector 48 assesses an image domain of the plasma 60 included within the observation image 36 based on a luminance value of each pixel of the observation image 36. Since the luminance value of the image domain of the plasma 60 is higher than the luminance value of another domain within the observation image 36, the luminance detector 48 identifies, for example, a domain having a luminance value greater than or equal to a predetermined threshold value within the observation image 36 as an image domain of the plasma 60.

Next, the luminance detector 48 detects, for example, an integrated value of luminance values of pixels within the image domain of the plasma 60 as a "luminance of the plasma 60". As already described above, since the imaging device of the microscope 35 has sensitivity to all wavelength bands of the plasma 60, the luminance detector 48 can detect a luminance of the plasma 60 based on a result of conversion of light in all wavelength bands of the plasma 60 to luminance.

Every time the luminance detector 48 detects a luminance of the plasma 60 for each machining spot SP, the luminance detector 48 then outputs the detection result to the machined state assessing unit 50.

The luminance detector 48 may detect a maximum value or an average value of the luminance values as a "luminance of the plasma 60" instead of the detection of an integrated value of luminance values of pixels within the image domain of the plasma 60 as a "luminance of the plasma 60".

Based on the result of the detection of a luminance of the plasma 60 for each machining spot SP input from the luminance detector 48 and known energy of the laser light L, the machined state assessing unit 50 assesses a machined state of the machined groove 9 (depth and temperature of the machined groove 9) at each machining spot SP.

First, the machined state assessing unit 50 obtains the correspondence information 62 from the storage 39. In this case, the machined state assessing unit 50 functions as a correspondence information obtaining unit of the presently disclosed subject matter. The machined state assessing unit 50 may obtain the correspondence information 62 over the Internet or the like externally to the laser machining device 10 instead of obtaining the correspondence information 62 from the storage 39 in the laser machining device 10.

The correspondence information 62 is information indicating a correspondence relationship among a luminance of the plasma 60, energy of laser light L and a depth and temperature of a machined groove 9 at a machining spot SP and is generated based on an experiment, a simulation, or the like in advance and is stored in the storage 39. The correspondence information 62 includes a removed-amount arithmetic expression 62A, a groove depth arithmetic expression 62B, and a temperature arithmetic expression 62C. Although the correspondence information 62 of this embodiment is configured by arithmetic expressions (mathematical expressions), a data table indicating the aforementioned correspondence relationship or the like may be used.

The removed-amount arithmetic expression 62A is an arithmetic expression that represents a correspondence relationship among a luminance of the plasma 60, energy of laser light L, and a removed amount of a substance at a machining spot SP. This removed-amount arithmetic expression 62A is expressed by, for example, a mathematical expression ($\alpha A+a=\beta B+b=\gamma C+c$) where "A" is a removed amount, "B" is energy, and "C" is a luminance of the plasma 60. Here, $\alpha$, $\beta$, and $\gamma$ are coefficients relating to A, B, and C, respectively, and each of a, b, and c is an intercept. The energy "B" is known, and since the luminance "C" of the plasma 60 is detected by the luminance detector 48, the removed amount "A" of a substance at a machining spot SP can be acquired by inputting "B" and "C" to the aforementioned removed-amount arithmetic expression 62A.

The groove depth arithmetic expression 62B is an arithmetic expression that represents a correspondence relationship between a removed amount "A" of a substance at a machining spot SP and a depth of the machined groove 9. As this groove depth arithmetic expression 62B, an expression may be used which includes a removed amount "A" and an area (spot diameter) of a machining spot SP as variables and by which a depth of the machined groove 9 can be derived. Instead of preparation of the removed-amount arithmetic expression 62A and the groove depth arithmetic expression 62B, an expression may be used by which a depth of the machined groove 9 can be directly calculated from the energy "B", the luminance "C" of the plasma 60, the area of a machining spot SP or the like.

The temperature arithmetic expression 62C is an arithmetic expression that represents a correspondence relationship among a luminance of the plasma 60, energy of laser light L, and a temperature at a machining spot SP. As this temperature arithmetic expression 62C, an expression may be used which includes energy "B" and a luminance "C" of the plasma 60 as variables and by which a temperature of a machining spot SP can be derived, like the aforementioned removed-amount arithmetic expression 62A.

Based on a luminance "C" of the plasma 60 input from the luminance detector 48 and known energy "B" of laser light L, the machined state assessing unit 50 calculates a removed amount "A" of a substance at a machining spot SP by using the removed-amount arithmetic expression 62A. Next, based on the result of the calculation of the removed amount "A" of a substance at the machining spot SP and a known area of the machining spot SP, the machined state assessing unit 50 calculates a depth of the machined groove 9 at the machining spot SP by using the groove depth arithmetic expression 62B.

Also, based on a luminance "C" of the plasma 60 input from the luminance detector 48 and known energy "B" of laser light L, the machined state assessing unit 50 calculates a temperature at a machining spot SP by using the temperature arithmetic expression 62C.

Hereinafter, every time a luminance "C" of the plasma 60 at a new machining spot SP is input from the luminance detector 48, the machined state assessing unit 50 repeatedly performs the calculation of a depth and temperature of the machined groove 9 at the machining spot SP. Thus, a depth and temperature of the machined groove 9 at each machining spot SP along a street CH can be acquired. Also, based on the calculation result of a depth of the machined groove 9 at each machining spot SP, the stability of a shape of a bottom surface of the machined groove 9 along the street CH can be evaluated.

Also, since there is a link between a luminance of the plasma 60 at a machining spot SP and a depth and temperature of the machined groove 9 at the machining spot SP, the stability of the depth and temperature of the machined groove 9 for each machining spot SP can be evaluated from dispersion values of the luminance of the plasma 60 at each machining spot SP along a street CH.

The display controller 52 controls display on the monitor 20. The display controller 52 causes the monitor 20 to display an observation image 36 output from the microscope 35 and a result of assessment of a machined state of the machined groove 9 at each machining spot SP by the machined state assessing unit 50.

Operations of First Embodiment

Figure 7:
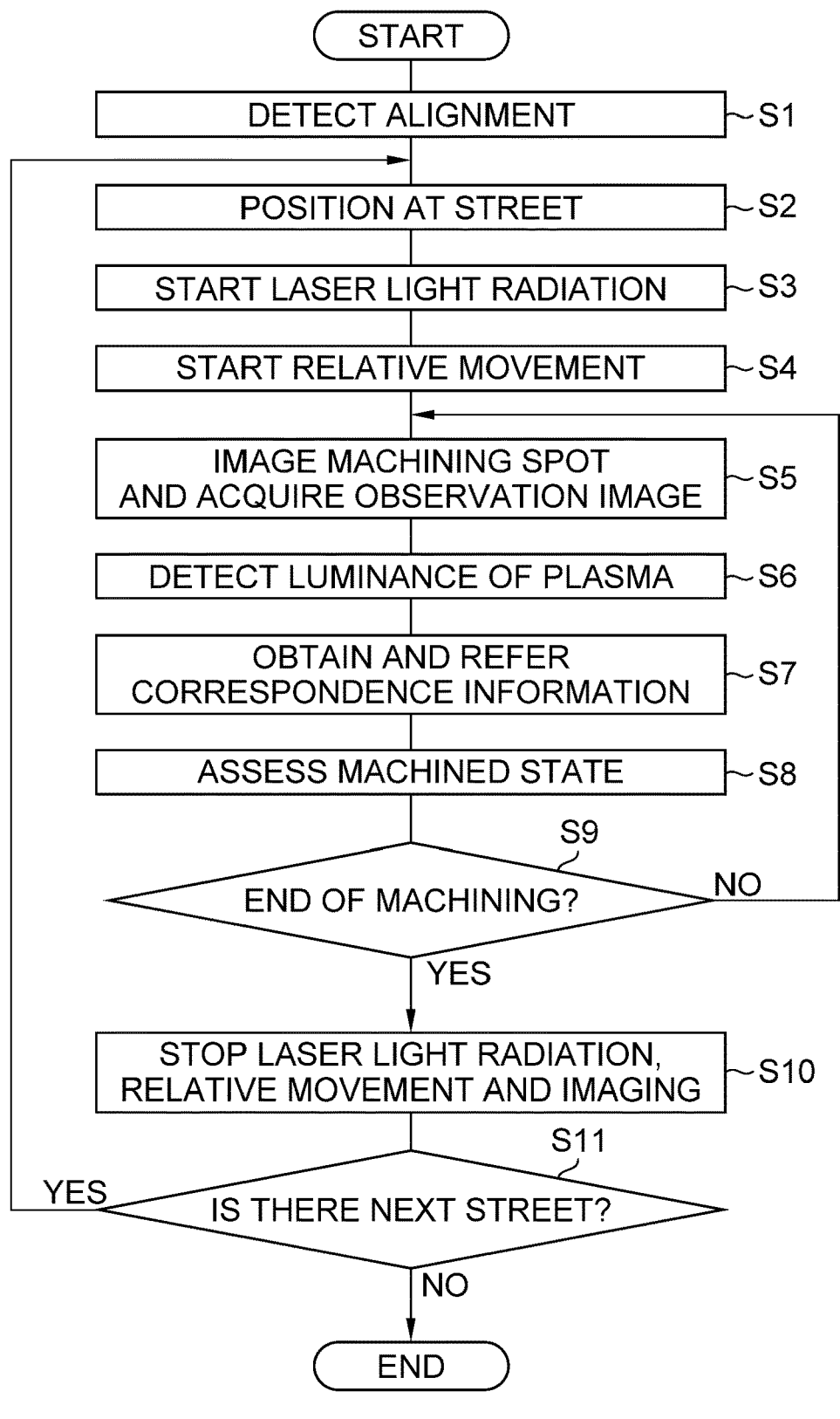
FIG. 7 is a flowchart illustrating a flow of laser machining processing for each street on a wafer by the laser machining device according to the first embodiment.

FIG. 7 is a flowchart illustrating a flow of laser machining processing for each street CH on a wafer W by the laser machining device 10 of the first embodiment according to a control method of the presently disclosed subject matter.

As illustrated in FIG. 7, when a wafer W to be processed is absorbed and held by the absorbing stage 16, the detection controller 40 of the controller 22 operates. The detection controller 40 controls the movement mechanism 24 and the observation optical system 30 and acquires an observation image 36 on an alignment reference of the wafer W. Then, the detection controller 40 analyzes the observation image 36 and performs alignment detection that detects a position of each street CH on the wafer W (step S1).

Upon completion of the alignment detection, the laser machining controller 42 operates. Then, based on a result of the alignment detection by the detection controller 40, the laser machining controller 42 drives the movement mechanism 24 and performs alignment which positions the optical axis of the condenser lens 29 at one end of the first street CH (step S2).

Next, the laser machining controller 42 causes the laser optical system 25 to emit (condense) laser light L to the one end of the first street CH and thus forms a machined groove 9 (step S3). At that time, a surface layer (a Low-k film or the like) of the street CH is brought into a plasma state by heat of the laser light L so that plasma 60 is generated at the machining spot SP for the laser light L.

Next, the laser machining controller 42 drives the movement mechanism 24 to move the XYZθ stage 14 in the X direction so that the laser optical system 25 relatively moves in the X direction with respect to the wafer W (step S4). Thus, laser machining, that is, forming of a machined groove 9 is started along the first street CH.

Also, in response to the start of the laser machining, the imaging controller 44 and the observation image acquiring unit 46 operate. Thus, the imaging controller 44 controls the microscope 35 in the observation optical system 30 in synchronization with, for example, an emission trigger of laser light L so as to perform imaging of a machining spot SP of the laser light L, and the observation image acquiring unit 46 performs acquisition of an observation image 36 of the machining spot SP from the microscope 35 and output of the observation image 36 to the luminance detector 48 (step S5, corresponding to an observation image acquiring step of the presently disclosed subject matter).

The luminance detector 48 having received the input of the observation image 36 of the machining spot SP identifies an image domain of the plasma 60 from inside of the observation image 36 and detects, for example, a luminance of the plasma 60 based on luminance values of pixels within the image domain (step S6, corresponding to a luminance detecting step of the presently disclosed subject matter). Then, the luminance detector 48 outputs a result of the detection of a luminance of the plasma 60 to the machined state assessing unit 50.

The machined state assessing unit 50 having received the input of the result of the detection of a luminance of the plasma 60 first obtains correspondence information 62 from the storage 39 (step S7, corresponding to a correspondence information obtaining step of the presently disclosed subject matter). Then, based on the result of the detection of a luminance of the plasma 60 and known energy of the laser light L, the machined state assessing unit 50 assesses a machined state of the machined groove 9 (depth and temperature of the machined groove 9) at the machining spot SP by using the correspondence information 62 (step S8, corresponding to a machined state assessing step of the presently disclosed subject matter).

Also, the machined state assessing unit 50 causes the monitor 20 to display a result of the assessment of a machined state through the display controller 52.

Hereinafter, while laser machining is being performed on the first street CH along the X direction, obtaining of an observation image 36, detection of a luminance of the plasma 60, assessment of a machined state of the machined groove 9 by using the correspondence information 62 and display of a result of the assessment of the machined state are repeatedly performed for each machining spot SP along the street CH (NO in step S9). Thus, an operator can evaluate a depth of the machined groove 9 in real time for each machining spot SP without tearing the wafer W and can evaluate in real time a shape of the bottom surface of the machined groove 9 based on the depth of the machined groove 9 for each machining spot SP. Also, an operator can evaluate in real time a damage due to a temperature based on a result of assessment of the temperature at each machining spot SP.

After the laser machining on the first street CH completes (Yes in step S9), the laser machining controller 42 stops the relative movement of the laser optical system 25 by the movement mechanism 24 and the emission of laser light L from the laser optical system 25, and the imaging controller 44 stops imaging by the observation optical system 30 (step S10).

Next, laser machining on the second street CH is started (NO in step S11). In the same manner hereinafter, the processing from step S2 to step S10 is repeatedly performed on each of the second and subsequent streets CH (YES in step S11). Thus, obtaining of an observation image 36, detection of a luminance of the plasma 60, assessment of a machined state of the machined groove 9 and display of a result of the assessment of the machined state are repeatedly performed for each machining spot SP along each street CH.

Effects of First Embodiment

As described above, based on a result of detection at each machining spot SP of a luminance of the plasma 60 which moves along a street CH during laser machining on each street CH, the laser machining device 10 of the first embodiment can assess (or monitor) in real time a machined state (depth and temperature of the machined groove 9) of the laser machining at each machining spot SP. As a result, the depth of the machined groove 9 at each machining spot SP, the stability of the shape of the bottom surface of the machined groove 9, and a damage due to the temperature can be evaluated in real time.

Second Embodiment

Figure 8:
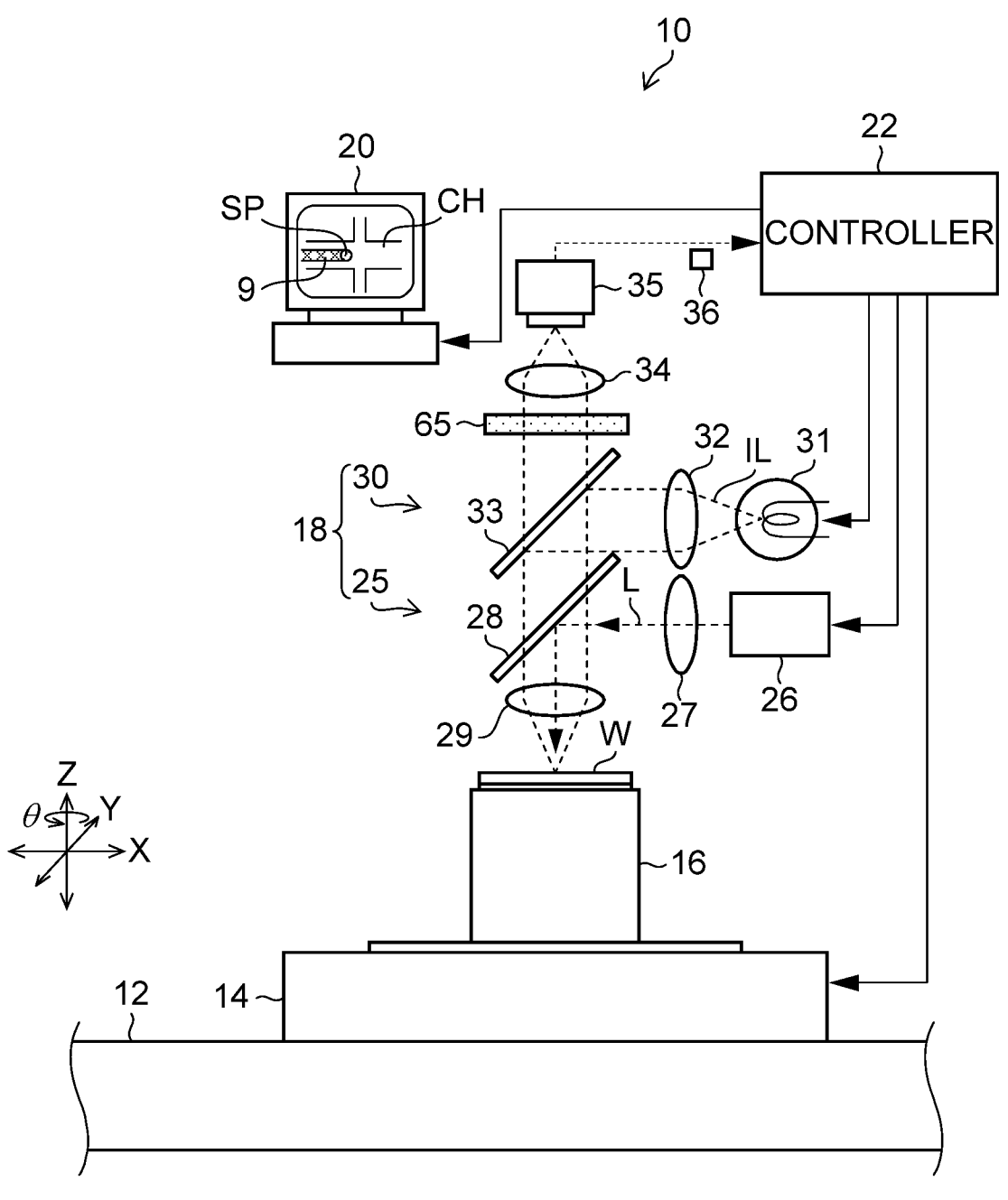
FIG. 8 is a schematic diagram of a laser machining device according to a second embodiment.

FIG. 8 is a schematic diagram of a laser machining device 10 according to a second embodiment. According to the aforementioned first embodiment, a luminance of the plasma 60 is detected from an observation image 36 of a machining spot SP imaged by the microscope 35. Since the plasma 60 has a broad wavelength band at that time, the wavelength band of the laser light L is included in the wavelength band of the plasma 60, and an influence of scattered light of the laser light L at a machining spot SP is included in a result of detection of a luminance of the plasma 60 by the luminance detector 48 of the first embodiment. Accordingly, the laser machining device 10 of the second embodiment suppresses the influence of the scattered light of the laser light L included in a result of detection of a luminance of the plasma 60.

The laser machining device 10 of the second embodiment has basically the same configuration as that of the laser machining device 10 of the first embodiment except that a filter 65 is provided. Thus, like references are given to like parts in terms of their function or configuration between the aforementioned first embodiment and the second embodiment, and repetitive description is omitted.

The filter 65 corresponds to an optical element of the presently disclosed subject matter and is provided on an optical path between the condenser lens 34 and the microscope 35. The position where the filter 65 is placed is a position on an optical path from the wafer W to the microscope 35 and is not particularly limited if it is a position excluding an optical path of the laser light L from the laser light source 26 to the wafer W. Also, the filter 65 may be provided in the microscope 35.

The filter 65 blocks light in a wavelength band of the laser light L, that is, prevents light in a wavelength band of the laser light L from entering to the microscope 35. As the filter 65, various kinds of publicly known filter that allows light in a specific wavelength band to pass through or blocks light in a specific wavelength band such as a high pass filter, a low pass filter, and a band pass filter may be used (or a combination of two kinds of filter may be used). Also, instead of the filter 65, a dichroic mirror, a dichroic prism or the like may be used.

The microscope 35 of the second embodiment performs imaging of a machining spot SP through the filter 65 while laser machining is being performed on each street CH. Thus, imaging of light in a wavelength band of laser light L by an imaging device of the microscope 35 is prevented. As a result, the luminance detector 48 of the second embodiment can detect a luminance of the plasma 60 based on light in a wavelength band excluding the wavelength band of the laser light L among all wavelength bands of the plasma 60.

As described above, according to the second embodiment, by blocking light in the wavelength band of the laser light L entering the microscope 35 with the filter 65, the influence (noise) of scattered light of the laser light L included in a result of detection of a luminance of the plasma 60 can be suppressed. As a result, assessment of a machined state of a machined groove 9 at each machining spot SP can be performed with higher precision.

The filter 65 may be insertably and removably provided on an optical path between the condenser lens 34 and the microscope 35 with an actuator, not illustrated, instead of placing at all times the filter 65 on the optical path between the condenser lens 34 and the microscope 35. Thus, for example, in a case of alignment detection or the like excluding laser machining on each street CH, the filter 65 can be retracted from the aforementioned optical path.

Third Embodiment

Next, a laser machining device 10 according to a third embodiment of the presently disclosed subject matter is described. Although each of the embodiments above is described on the assumption that machining conditions excluding energy of laser light L are the same in a case where laser machining is performed on each street CH, the laser machining device 10 of the third embodiment performs laser machining on each street CH selectively under a plurality of machining conditions.

Figure 9:
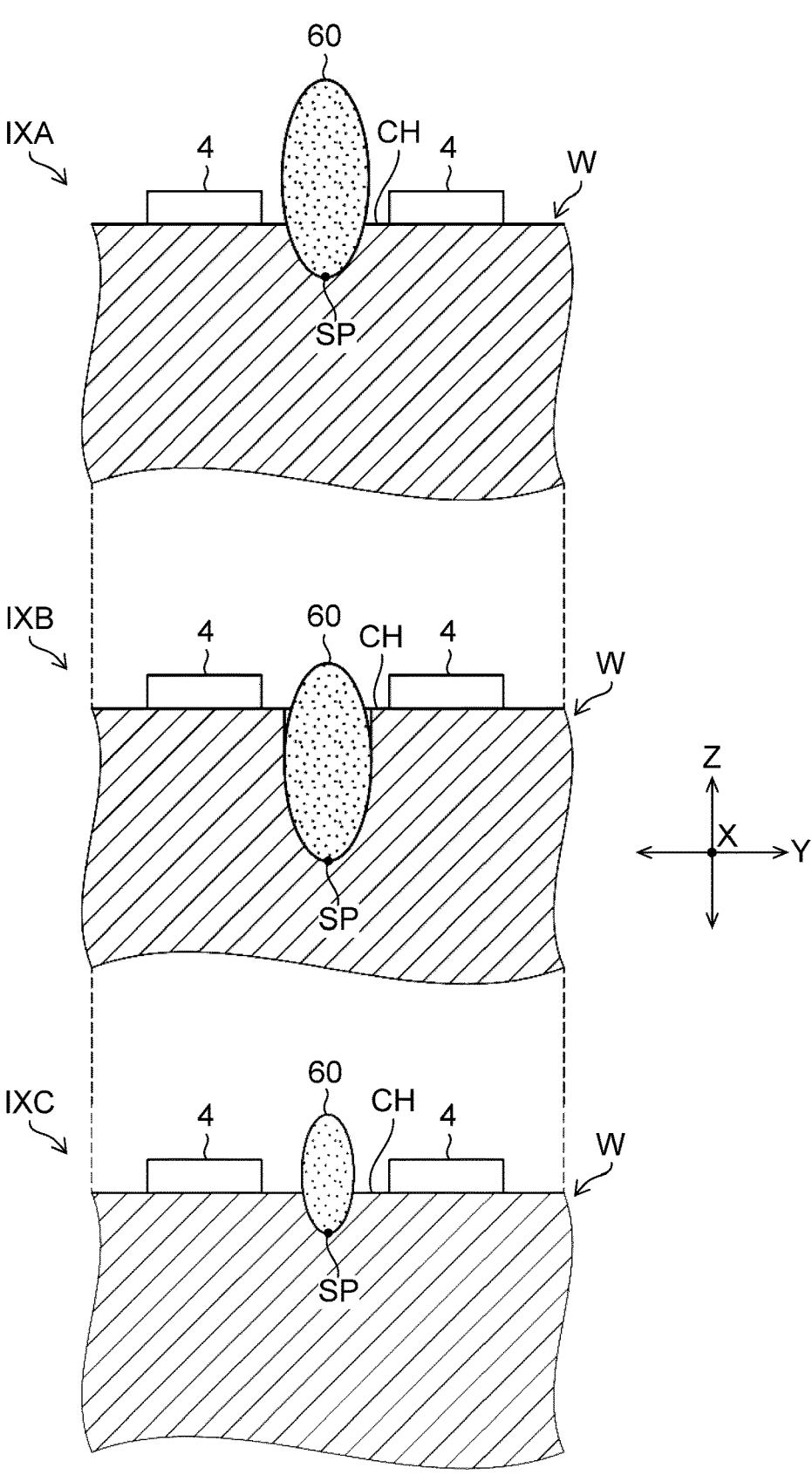
FIG. 9 is an explanatory diagram illustrating an example of a machining condition for laser machining of each street.

FIG. 9 is an explanatory diagram illustrating an example of a machining condition for laser machining on each street CH. As illustrated in FIG. 9, the laser machining device 10 of the third embodiment performs laser machining on each street CH selectively under three of first machining condition to a third machining condition in which, for example, at least one of a depth position (position in the Z direction) of the machining spot SP from a surface of a wafer W and a removed amount of a substance caused by forming of a machined groove 9 is different.

As indicated by reference characters IXA in FIG. 9, under the first machining condition, the depth position of the machining spot SP is set near the surface of the wafer W and is set such that the removed amount of a substance increases (that is, the depth of the machined groove 9 increases). Under this first machining condition, the luminance of the plasma 60 increases compared to other machining conditions.

As indicated by reference characters IXB in FIG. 9, under the second machining condition, the depth position of the machining spot SP is set at a deeper position (inner part of the wafer W) than the first machining condition and is set such that the removed amount of a substance increases. Under this second machining condition, since the plasma 60 enters into a more inner part of the wafer W than under the first machining condition, the luminance of the plasma 60 to be observed by the observation optical system 30 decreases compared to the first machining condition.

As indicated by reference characters IXC in FIG. 9, under the third machining condition, the depth position of the machining spot SP is set near the surface of the wafer W and is set such that the removed amount of a substance decreases (that is, the depth of the machined groove 9 decreases). Under this third machining condition, the luminance of the plasma 60 decreases compared to other machining conditions.

The number of machining conditions may be increased to four or more by including a spot diameter of the laser light L (machining spot SP), a material of a street CH (wafer W), and so on.

In this manner, also when machining conditions other than energy of laser light L are different, luminance of the plasma 60 to be observed by the observation optical system 30 varies. Thus, even if the energy of laser light L and the luminance of the plasma 60 are the same among the machining conditions, a depth of the machined groove 9 formed at a machining spot SP and a temperature of the machining spot SP differ from each other among the machining conditions. Accordingly, in the laser machining device 10 of the third embodiment, a machined state of the machined groove 9 at each machining spot SP is assessed by using the correspondence information 62 that differs among machining conditions.

Figure 10:
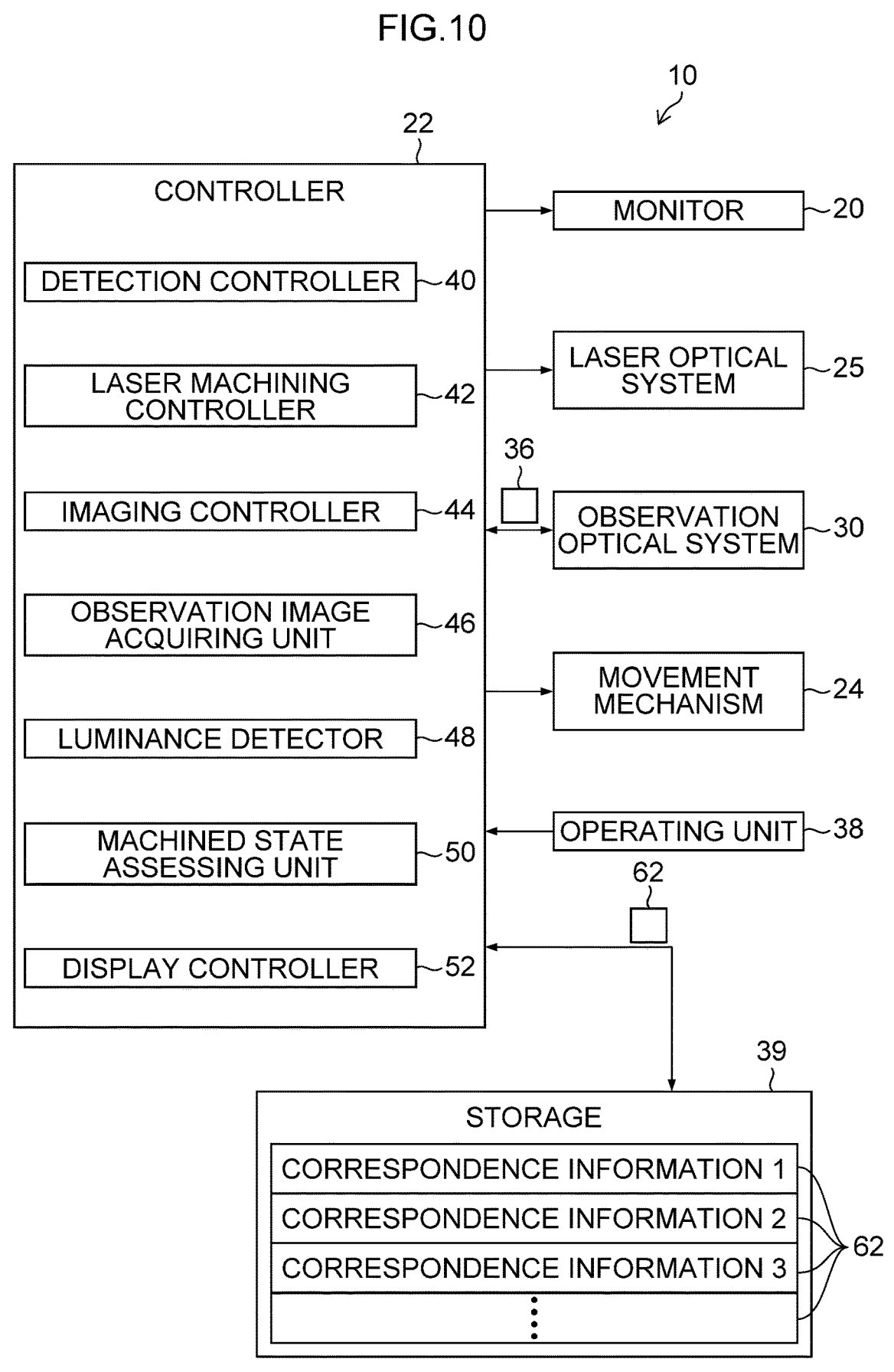

FIG. 10 is a functional block diagram of the controller 22 in the laser machining device 10 according to the third embodiment. As illustrated in FIG. 10, since the laser machining device 10 in the third embodiment has basically the same configuration as that of the laser machining device 10 in the aforementioned embodiments except that a plurality of pieces of correspondence information 62 corresponding to a plurality of machining conditions (first machining condition to third machining condition) are stored in the storage 39, like references are given to those having the same function or configuration as that of each of the aforementioned embodiments, and repetitive description is omitted.

Each correspondence information 62 is information indicating a correspondence relationship among a "luminance of the plasma 60", "energy of laser light L" and a "depth and temperature of a machined groove 9 at a machining spot SP" and is generated for each machining condition based on an experiment, a simulation, or the like in advance and is stored in the storage 39.

The operating unit 38 in the third embodiment receives a selection operation that selects a machining condition. In this case, the operating unit 38 functions as a machining condition selecting unit of the presently disclosed subject matter.

The laser machining controller 42 according to the third embodiment controls the movement mechanism 24 and the laser optical system 25 in accordance with the machining condition (a depth position of the machining spot SP or the like) selected through the operating unit 38 and forms a machined groove 9 along the street CH to be processed.

The machined state assessing unit 50 of the third embodiment obtains, from the storage 39, correspondence information 62 corresponding to the machining condition selected through the operating unit 38. Hereinafter, like the aforementioned embodiments, every time a result of the detection of a luminance of the plasma 60 at a new machining spot SP is input from the luminance detector 48, the machined state assessing unit 50 assesses a machined state of the machined groove 9 at the machining spot SP by using the correspondence information 62 obtained in advance based on the result of the detection of a luminance and known energy of laser light L.

In this way, in the third embodiment, since a machined state of the machined groove 9 can be assessed by using the correspondence information 62 that differs among machining conditions, the machined state of the machined groove 9 can be more precisely assessed.

Fourth Embodiment

Figure 11:
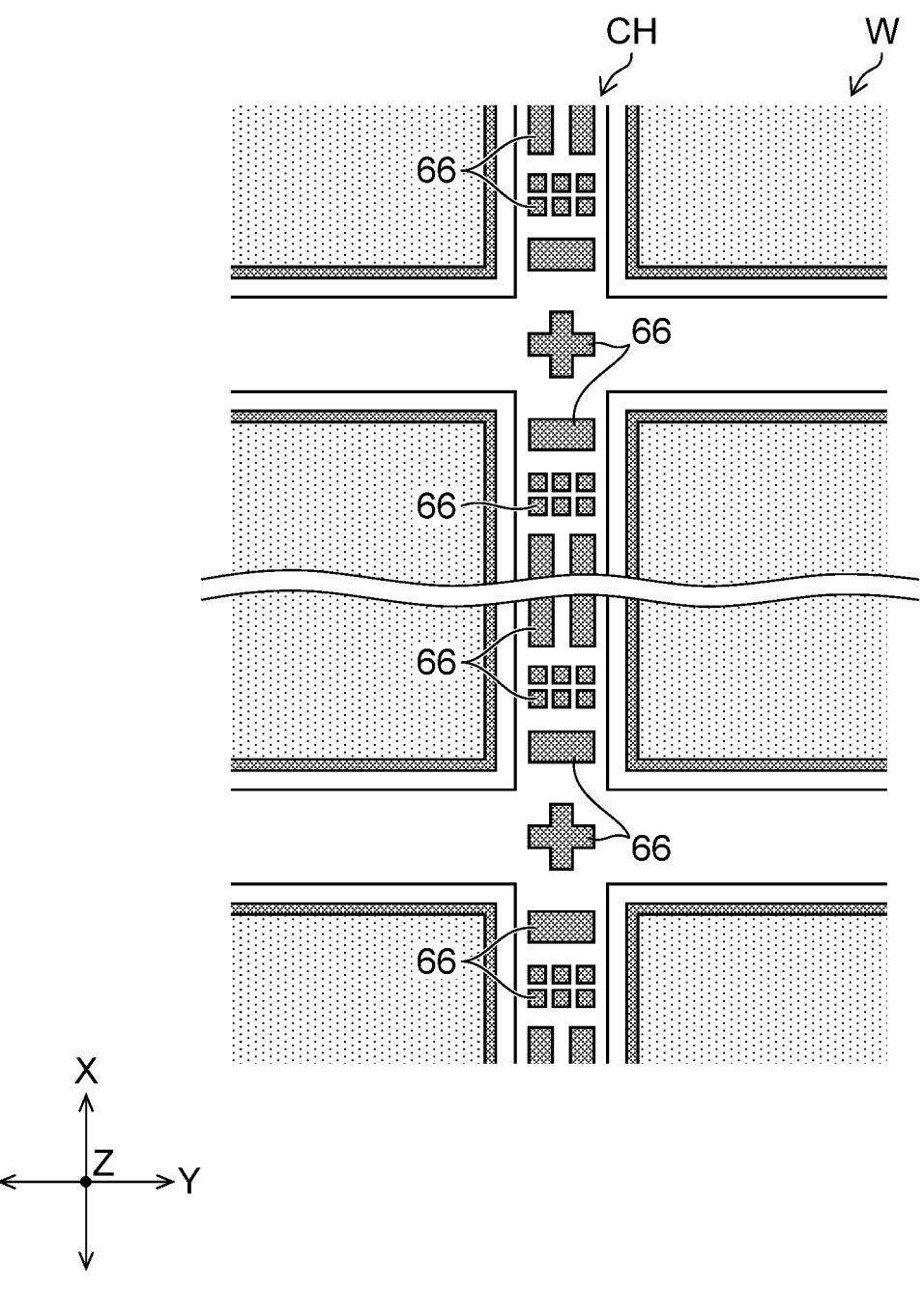
FIG. 11 is an enlarged diagram of streets on which laser machining is to be performed by a laser machining device according to a fourth embodiment.

FIG. 11 is an enlarged diagram of streets CH on which laser machining is to be performed by a laser machining device 10 according to a fourth embodiment. While the surface of a street CH is formed by one material (such as silicon dioxide, for example) for a Low-k film in the aforementioned embodiments, a pattern 66 such as Test Element Group (TEG) may be made of metal such as aluminum or the like on a part of a surface of a street CH as illustrated in FIG. 11. In this case, on the surface of the street CH, there exist a plurality of regions of different materials, including a region where a Low-k film or the like (of silicon dioxide or the like) is exposed and a region where the pattern 66 (of aluminum or the like) is formed. Then, the relationship among energy of laser light L, a luminance of the plasma 60, and a machined state of the machined groove 9 at a machining spot SP (a depth of the machined groove 9 and a temperature at the machining spot SP) differs among those materials.

Accordingly, in the laser machining device 10 of the fourth embodiment, a machined state of the machined groove 9 at each machining spot SP is assessed by using the correspondence information 62 that differs among materials on a surface of a street CH.

Figure 12:
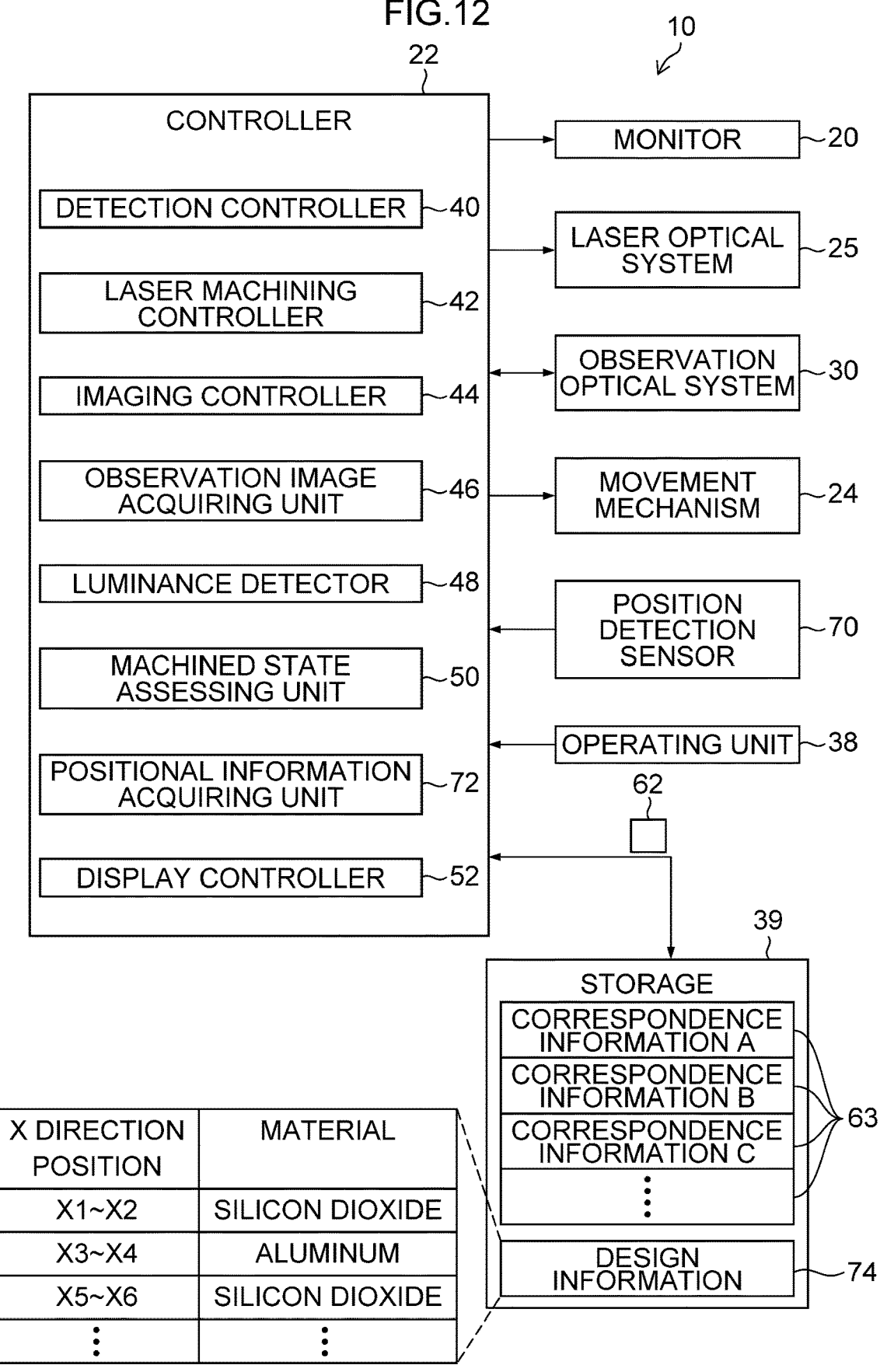
FIG. 12 is a functional block diagram of a controller in the laser machining device according to the fourth embodiment.

FIG. 12 is a functional block diagram of the controller 22 in the laser machining device 10 according to the fourth embodiment. As illustrated in FIG. 12, a laser machining device 10 of the fourth embodiment has basically the same configuration as that of the laser machining device 10 of the aforementioned embodiments except that a position detection sensor 70 is connected to the controller 22, the controller 22 also functions as a positional information acquiring unit 72 in addition to the aforementioned components, and design information 74 and a plurality of pieces of correspondence information 63 are stored in the storage 39. Thus, like references are given to like parts in terms of their function or configuration between the aforementioned embodiments and the fourth embodiment, and repetitive description is omitted.

As illustrated in FIG. 12, the position detection sensor 70 is provided on the XYZθ stage 14, for example, and detects a position in the X, Y, Z, θ direction of the XYZO stage 14, and outputs the position detection result to the positional information acquiring unit 72.

While laser machining is being performed on a street CH by the laser optical system 25, the positional information acquiring unit 72 repeatedly detects an X direction position representing a relative position of a machining spot SP on the street CH based on a result of the position detection of the XYZθ stage 14 input from the position detection sensor 70, and repeatedly outputs the X direction position of the machining spot SP to the machined state assessing unit 50. The detection of an X direction position of a machining spot SP by the positional information acquiring unit 72 may preferably be performed in synchronization with an emission trigger of the laser light L, that is, in synchronization with imaging of the machining spot SP, which have already been described.

The design information 74 is information indicating a material at each X direction position (at each region) on each street CH of the wafer W. By comparing a result of the detection of an X direction position of a machining spot SP by the positional information acquiring unit 72 and the design information 74, a material on the surface of the street CH at the position of the machining spot SP can be identified.

Each correspondence information 63 is information indicating a correspondence relationship among a "luminance of the plasma 60", "energy of laser light L" and a "depth and temperature of a machined groove 9 at a machining spot SP" for each material of a street CH and is generated for each machining condition based on an experiment, a simulation, or the like in advance and is stored in the storage 39.

The machined state assessing unit 50 of the fourth embodiment, while laser machining is being performed on a street CH by the laser optical system 25, identifies a material on the surface of the street CH at the position of a machining spot SP with reference to the design information 74 based on the detection result of the X direction position of the machining spot SP input from the positional information acquiring unit 72 and obtains correspondence information 63 corresponding to the material from the storage 39. Then, the machined state assessing unit 50 assesses a machined state of the machined groove 9 at the machining spot SP by using the correspondence information 63 obtained in advance based on the result of the detection of a luminance of the plasma 60 input from the luminance detector 48 and known energy of laser light L.

Hereinafter, the machined state assessing unit 50 repeatedly performs, for each machining spot SP, detection of an X direction position of the machining spot SP, identification of a material on the surface of the street CH, obtaining of the correspondence information 63, and assessment of a machined state of a machined groove 9 at the machining spot SP.

Figure 13:
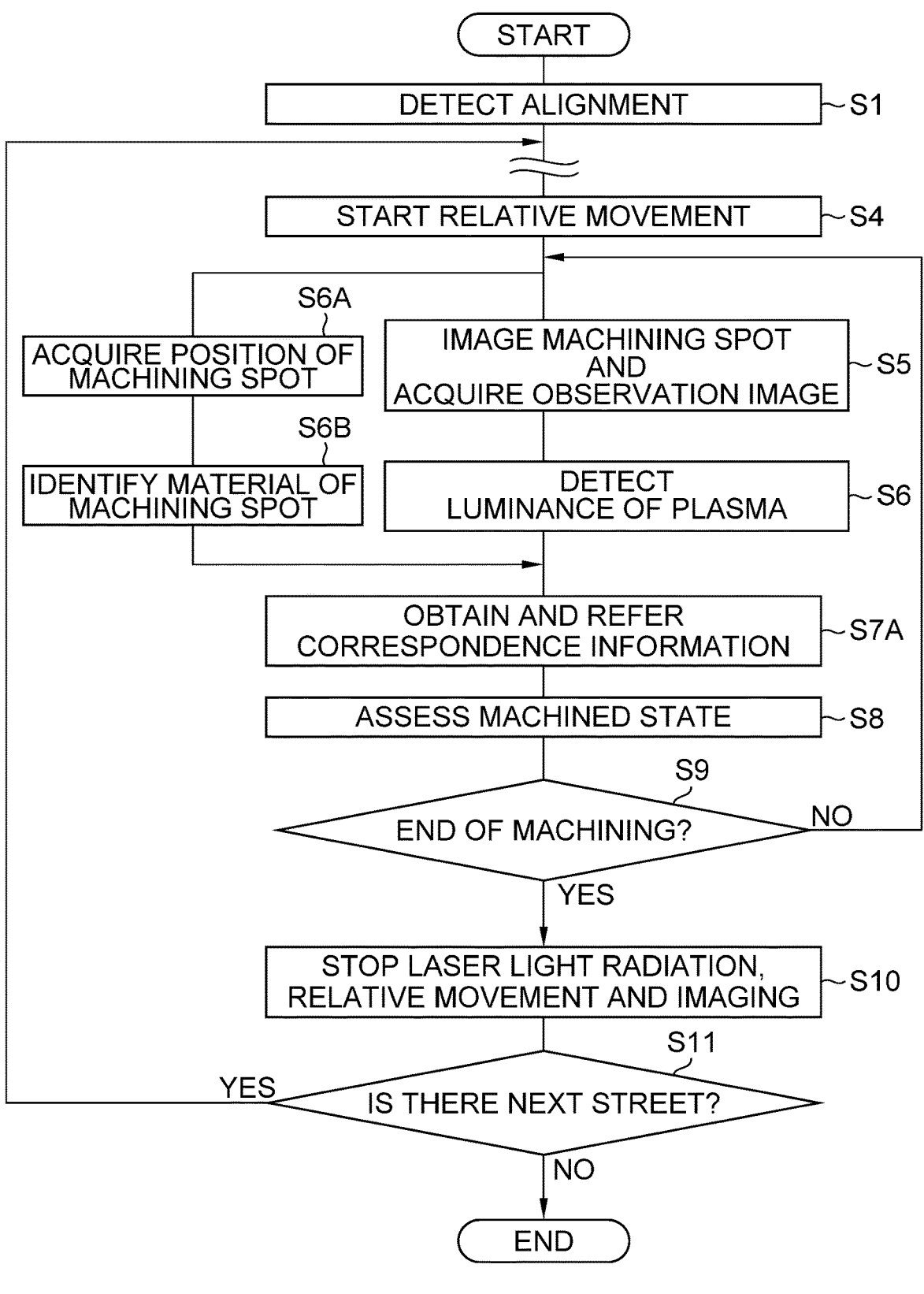
FIG. 13 is a flowchart illustrating a flow of laser machining processing for each street on a wafer by the laser machining device according to the fourth embodiment.

FIG. 13 is a flowchart illustrating a flow of laser machining processing for each street CH on a wafer W by the laser machining device 10 according to the fourth embodiment. Since the processing from step S1 to step S6 is the same as that of the aforementioned first embodiment (see FIG. 7), specific description is omitted here.

After laser machining is started along a street CH to be processed as illustrated in FIG. 13, the positional information acquiring unit 72, in parallel with steps S5 and S6 as already described above, detects an X direction position of a machining spot SP in synchronization with an emission trigger for laser light L based on the position detection result by the position detection sensor 70 and outputs the X direction position of the machining spot SP to the machined state assessing unit 50 (step S6A).

Next, the machined state assessing unit 50 identifies a material on the surface of the street CH at the position of the machining spot SP with reference to the design information 74 based on the detection result of the X direction position of the machining spot SP input from the positional information acquiring unit 72 (step S6B) and obtains correspondence information 63 corresponding to the material at the machining spot SP from the storage 39 (step S7A). Then, based on the result of the detection of a luminance of the plasma 60 in step S6 and known energy of the laser light L, the machined state assessing unit 50 assesses a machined state of the machined groove 9 at the machining spot SP by using the correspondence information 63 (step S8).

Hereinafter, for each machining spot SP along the street CH, the processing from step S5 to step S8 is repeatedly performed. Thus, for each machining spot SP, based on the correspondence information 63 corresponding to the material thereof, the assessment of a machined state of the machined groove 9 by the machined state assessing unit 50 is performed. Since the processing in subsequent steps is the same as that of the aforementioned first embodiment, specific description is omitted here.

In this way, in the fourth embodiment, by, for each position of a machining spot SP, identifying a material at the machining spot SP and assessing a machined state of the machined groove 9 by using the correspondence information 63 corresponding to the material at the machining spot SP, the machined state of the machined groove 9 can be more precisely assessed even when there are a plurality of regions having different materials on the surface of the street CH.

Fifth Embodiment

Next a laser machining device 10 according to a fifth embodiment of the presently disclosed subject matter is described. While the laser machining device 10 of the aforementioned embodiments assesses a machined state of a machined groove 9 at each machining spot SP, the laser machining device 10 of the fifth embodiment performs feedback control over laser machining such that a machined state of a machined groove 9 at each machining spot SP can be maintained constant based on a result of the assessment of the machined state of the machined groove 9.

Since the laser machining device 10 in the fifth embodiment has basically the same configuration as that of the laser machining device 10 in the aforementioned embodiments, like references are given to those having the same function or configuration as that of each of the aforementioned embodiments, and repetitive description is omitted.

Figure 14:
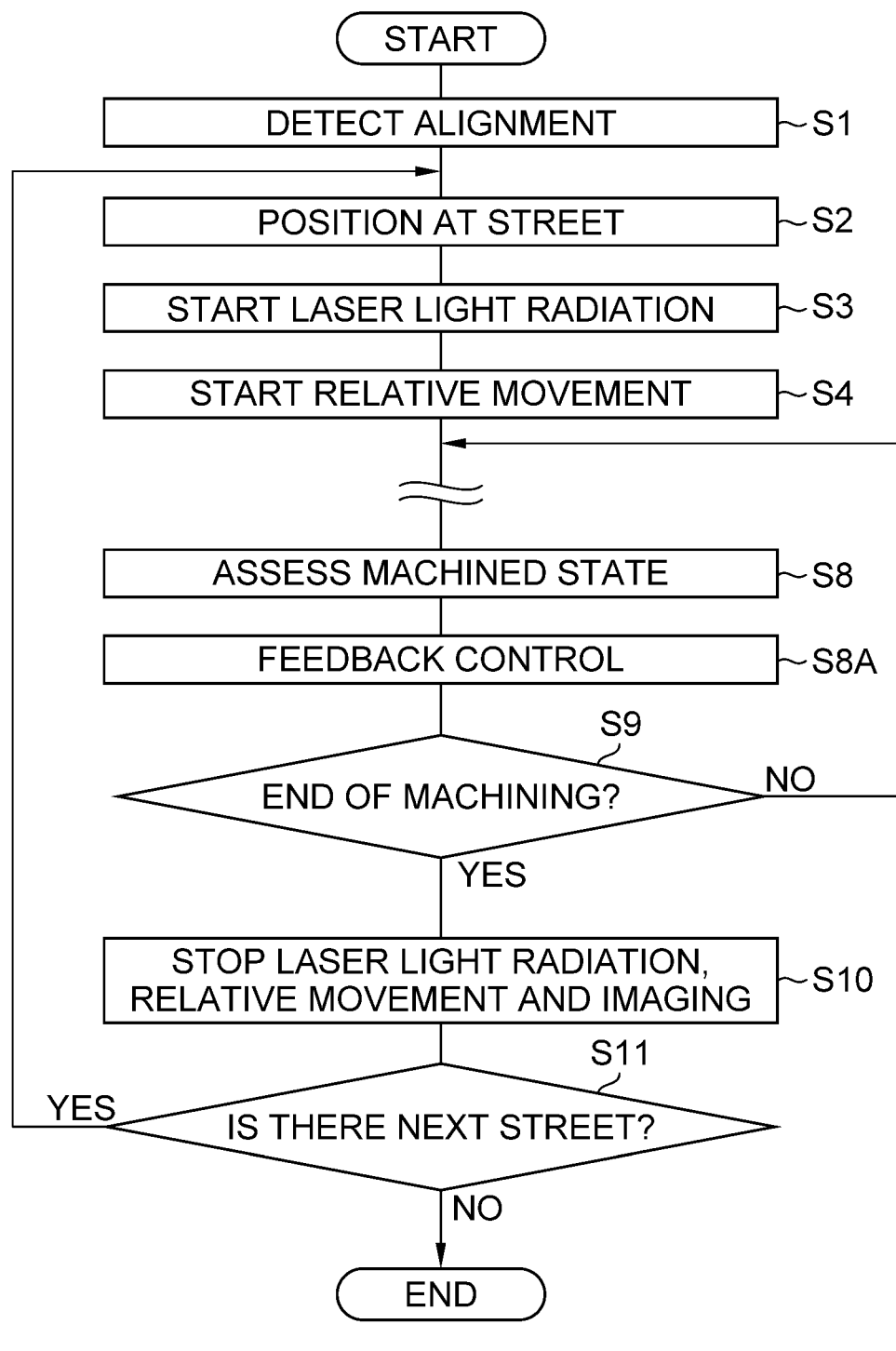
FIG. 14 is a flowchart illustrating a flow of laser machining processing for each street on a wafer by the laser machining device according to a fifth embodiment.

FIG. 14 is a flowchart illustrating a flow of laser machining processing for each street CH of a wafer W by the laser machining device 10 according to the fifth embodiment. Since the processing from step S1 to step S6 is the same as that of the aforementioned embodiments (see FIGS. 7 and 13), specific description is omitted here.

As illustrated in FIG. 14, when the machined state assessing unit 50 assesses a machined state of a machined groove 9 at a machining spot SP in step S8, the laser machining controller 42 performs feedback control that controls energy of laser light L emitted from the laser optical system 25 such that the machined state of the machined groove 9, for example, a depth of the machined groove 9 can be maintained constant (step S8A). The control over energy of laser light L increases or reduces energy (J) of the laser light L by increasing or reducing at least one of an output (watt) and a time (sec) of the laser light L.

For example, the laser machining controller 42 increases energy (J) of laser light L emitted from the laser optical system 25 if the depth or the like of the machined groove 9 is lower than a predetermined designed value. Conversely, the laser machining controller 42 reduces energy (J) of laser light L emitted from the laser optical system 25 if the depth or the like of the machined groove 9 is higher than the designed value.

Hereinafter, until the laser machining on the street CH to be processed ends, the laser machining controller 42 repeatedly performs the aforementioned feedback control every time the machined state assessing unit 50 assesses a depth of the machined groove 9 at a machining spot SP (step S9). Since the processing in subsequent steps is basically the same as that of the aforementioned embodiments, specific description is omitted here.

Figure 15:
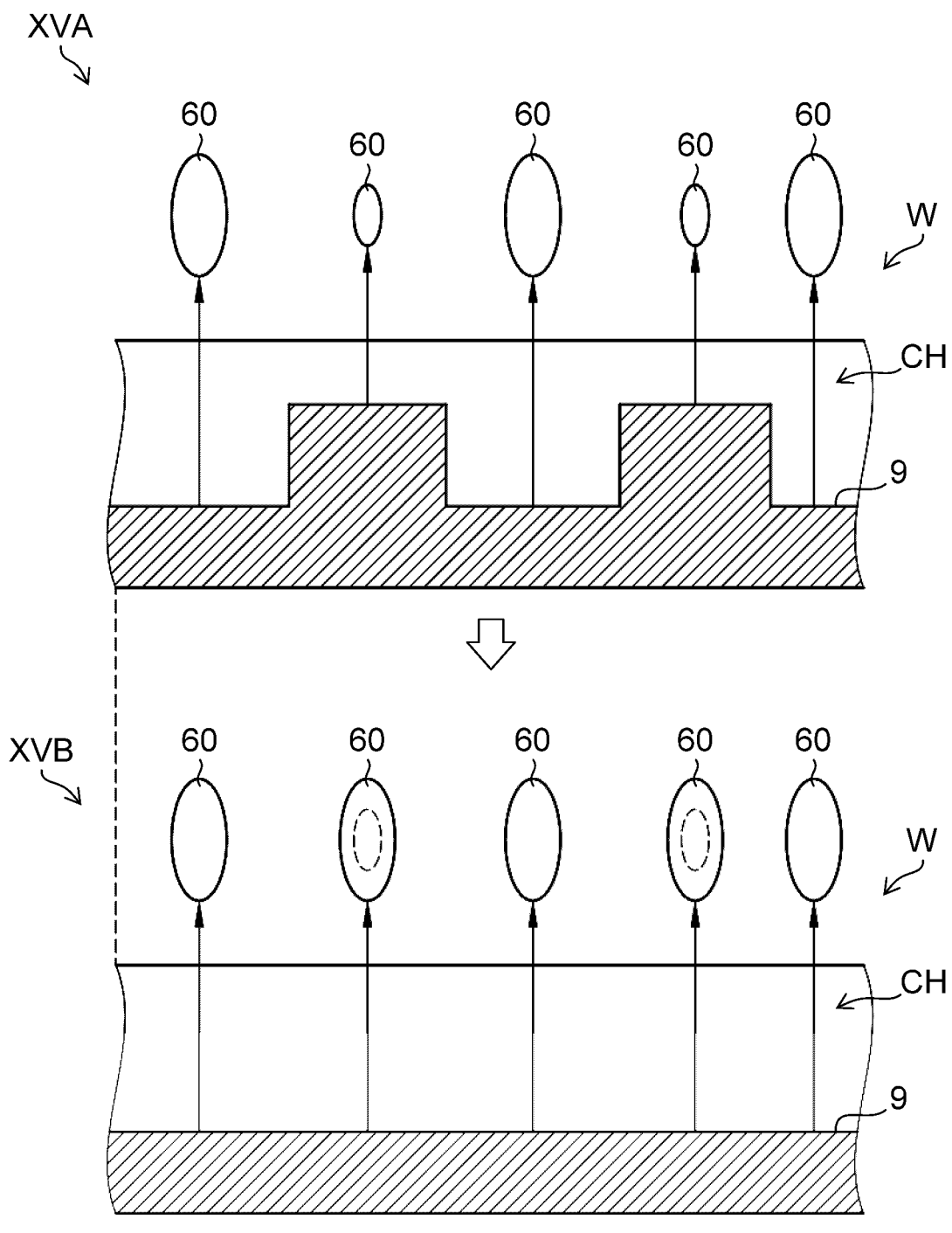
FIG. 15 is an explanatory diagram for explaining an effect of the laser machining device according to the fifth embodiment.

FIG. 15 is an explanatory diagram for explaining an effect of the laser machining device 10 according to the fifth embodiment. The reference character XVA in FIG. 15 exemplarily indicates a machined groove 9 at each machining spot SP in a case where feedback control is not performed, and the reference character XVB exemplarily indicates a machined groove 9 at each machining spot SP in a case where feedback control is performed.

As illustrated in FIG. 15, based on a result of detection of a luminance of the plasma 60 at each machining spot SP, the laser machining device 10 of the fifth embodiment can assess in real time a depth of the machined groove 9 at the machining spot SP so that the energy of the laser light L can be controlled so as to maintain the depth of the machined groove 9 constant. As a result, the depth of the machined groove 9 along the street CH can be maintained constant. Thus, quality of machining on the machined groove 9 can be improved.

Instead of maintaining the depth of the machined groove 9 constant or in addition to maintaining the depth of the machined groove 9 constant as the machined state of the machined groove 9, the machining temperature at the machining spot SP may be maintained constant.

Sixth Embodiment

Figure 16:
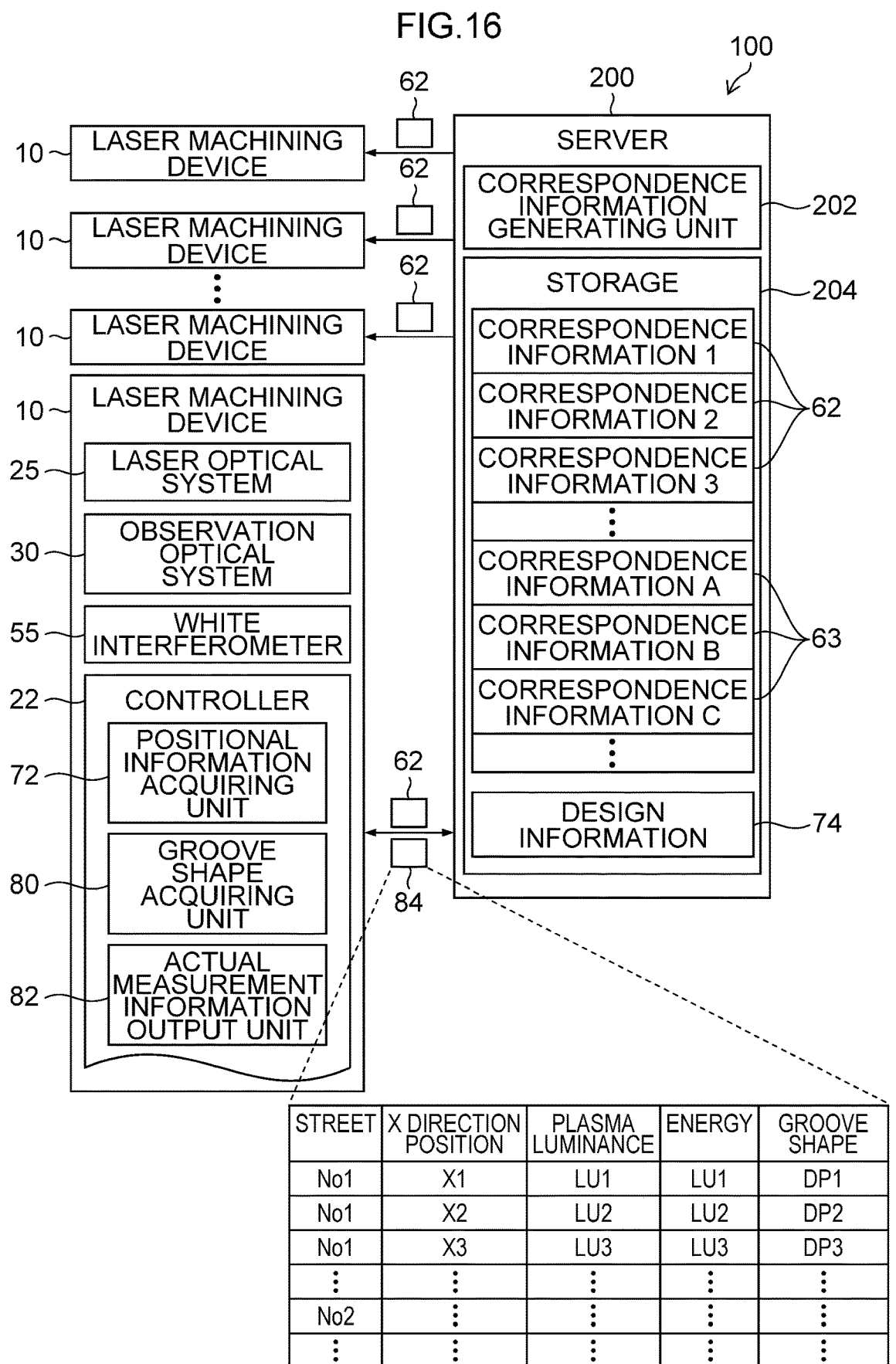
FIG. 16 is a block diagram of a configuration of a wafer processing system according to a sixth embodiment.

FIG. 16 is a block diagram illustrating a configuration of a wafer processing system 100 according to a sixth embodiment of the presently disclosed subject matter. Having described, as an example, the case where the laser machining device 10 is used alone in the aforementioned embodiments, a plurality of laser machining devices 10 (or one laser machining device is possible) are connected to a server 200 in the sixth embodiment, and, in the server 200, generation of correspondence information 62 (including the correspondence information 63) and delivery of the correspondence information 62 to each of the laser machining devices 10 are performed.

The wafer processing system 100 includes the plurality of laser machining devices 10 and the server 200. Like references are given to like parts in terms of their function or configuration between the aforementioned embodiments and the sixth embodiment, and repetitive description is omitted.

At least one laser machining device 10 of a plurality of laser machining devices 10 has a generation function for actual measurement information 84 to be used for generation of the correspondence information 62. The actual measurement information 84 includes an X direction position of each machining spot SP along a street CH, a detected value of a plasma luminance, energy of laser light L, a shape (actually measured value) of a machined groove 9, and so on. This laser machining device 10 has basically the same configuration as that of the laser machining device 10 of the aforementioned embodiments except that the laser machining device 10 includes a white interferometer 55 in addition to the components that have already been described and that the controller 22 functions as a positional information acquiring unit 72, a groove shape acquiring unit 80, and an actual measurement information output unit 82.

As the white interferometer 55, a publicly known type interferometer such as a Michelson interferometer is used. Every time a machined groove 9 is formed at each machining spot SP along a street CH to be processed while laser machining is being performed on the street CH, the white interferometer 55 acquires an interference image (interference pattern image) of the machined groove 9 through the condenser lens 29, for example (see Japanese Patent Application Laid-Open No. 2018-146391, for example). Based on this interference image, a groove shape of the machined groove 9 formed at the machining spot SP (height information (depth information) on each of the components on the bottom surface of the machined groove 9) can be acquired.

Based on the interference image acquired from the white interferometer 55 for each machining spot SP along a street CH to be processed while laser machining is being performed on the street CH to be processed, the groove shape acquiring unit 80 calculates a groove shape of the machined groove 9 and outputs the calculation result to the actual measurement information output unit 58. In the same manner hereinafter, every time laser machining is performed on all streets CH, the groove shape acquiring unit 80 calculates a groove shape of the machined groove 9 at each machining spot SP along each of the streets CH and outputs the calculation result to the actual measurement information output unit 58.

For each machining spot SP while laser machining is being performed on a street CH to be processed, the actual measurement information output unit 82 obtains an X direction position of the machining spot SP from the positional information acquiring unit 72, a result of detection of a luminance of the plasma 60 from the luminance detector 48, energy information on laser light L from the laser optical system 25, and a result of the calculation of a groove shape of the machined groove 9 from the groove shape acquiring unit 80. Then, based on these obtained results, the actual measurement information output unit 82 generates actual measurement information 84. Thus, a relationship among an X direction position, a plasma luminance, energy of laser light L, and a grove shape (actually measured value) of the machined groove 9 for each machining spot SP along a street CH can be acquired.

In the same manner hereinafter, the actual measurement information output unit 82 generates actual measurement information 84 every time laser machining is performed on all streets CH. Then, the actual measurement information output unit 82 outputs the actual measurement information 84 for each street CH on the wafer W to the server 200.

The server 200 includes an arithmetic circuit including various kinds of processors and memory or the like and functions as a correspondence information generating unit 202 and a storage 204.

Based on the actual measurement information 84 for each street CH on the wafer W input from the actual measurement information output unit 82, the correspondence information generating unit 202 generates correspondence information 62 corresponding to a kind of the wafer W. Notably, it is assumed that a relationship among a luminance of the plasma 60, energy of laser light L, and a temperature at a machining spot SP corresponding to a kind of the wafer W is measured in advance separately. Then, the correspondence information generating unit 202 stores the generated correspondence information 62 in the storage 204 in association with the kind of the wafer W.

The storage 204 stores the correspondence information 62 generated by the correspondence information generating unit 202 for each kind of wafer W. Thus, the machined state assessing unit 50 in each laser machining device 10 can assess a machined state of the machined groove 9 at each machining spot SP by using the correspondence information 62 stored within the storage 204 in the server 200. The aforementioned design information 74 may be stored within the storage 204 for each kind of wafer W, though not illustrated in the figure.

In this way, according to the sixth embodiment, by providing the laser machining device 10 with the function (white interferometer 55) for acquiring a shape of a machined groove 9, the correspondence information 62 can be generated. Thus, laser machining (monitoring of a machined state) on a new wafer W can be addressed easily. Furthermore, according to the sixth embodiment, by storing the correspondence information 62 within the storage 204 in the server 200, a plurality of laser machining devices 10 can share the correspondence information 62.

While, according to the aforementioned sixth embodiment, the white interferometer 55 is used to acquire a groove shape of a machined groove 9, various kinds of shape measuring device such as various kinds of interferometer, distance measuring device, laser scanner or stereo camera may be used to acquire a groove shape of the machined groove 9. Furthermore, a temperature sensor (such as an emission thermometer) which measures a temperature at a machining spot SP may be provided in the laser machining device 10 and may perform temperature measurement for each machining spot SP. Thus, it is assumed that a relationship among a luminance of the plasma 60, energy of laser light L, and a temperature at a machining spot SP corresponding to a kind of the wafer W can be acquired, and the correspondence information 62 indicating the relationship can be generated.

While, according to the aforementioned sixth embodiment, the correspondence information generating unit 202 is provided in the server 200, the correspondence information generating unit 202 may be provided in the controller 22 in the laser machining device 10.

Others

FIG. 17 is an explanatory diagram for explaining forming of two edge-cutting grooves 9A and a hollow groove 9B along a street CH by the laser machining device 10. Although the laser machining device 10 of the aforementioned embodiments forms one machined groove 9 along a street CH, the presently disclosed subject matter is not limited thereto. For example, as illustrated in FIG. 17, the presently disclosed subject matter is also applicable to a laser machining device 10 which performs edge cutting machining that forms two edge cutting grooves 9A (blocking grooves) along a street CH by using two rays of laser light L1 and hollowing machining that forms a hollow groove 9B (dividing groove) between the two edge cutting grooves 9A by using one ray of laser light L2 (see PTL 1 above). Also in this case, machined states of the two edge cutting grooves 9A and the hollow groove 9B can be assessed in real time for each machining spot SP of each of the rays of laser light L1 and L2.

Having described, according to the aforementioned embodiments, the XYZθ stage 14 and the movement mechanism 24, for example, as the movement mechanism of the presently disclosed subject matter, the configuration is not particularly limited if the machining unit 18 and the wafer W can be relatively moved.

While, according to the aforementioned embodiments, the emission optical axis of the laser optical system 25 and the observation optical axis of the observation optical system 30 are coaxial, the emission optical axis and the observation optical axis may be different from each other if a machining spot SP is included within the observation field of the observation optical system 30. In other words, the laser optical system 25 and the observation optical system 30 may be provided separately.

According to the aforementioned embodiments, the controller 22 may be provided separately from the laser machining device 10. In this case, the controller 22 corresponds to the laser machining device of the presently disclosed subject matter.

Although, according to the aforementioned embodiments, as a machined state of a machined groove 9 at each machining spot SP, a depth of the machined groove 9 and a temperature at the machining spot SP are assessed, kinds of machined state are not particularly limited.

REFERENCE SIGNS LIST

4: chip, 9: machined groove, 9A: edge cutting groove, 9B: hollow groove, 10: laser machining device, 12: base, 14: XYZθ stage, 16: absorbing stage, 18: machining unit, 20: monitor, 22: controller, 24: movement mechanism, 25: laser optical system, 26: laser light source, 27: collimating lens, 28: half mirror, 29: condenser lens, 30: observation optical system, 31: illuminating light source, 32: collimating lens, 33: half mirror, 34: condenser lens, 35: microscope, 36:

observation image, 38: operating unit, 39: storage, 40: detection controller, 42: laser machining controller, 44: imaging controller, 46: observation image acquiring unit, 48: luminance detector, 50: machined state assessing unit, 52: display controller, 55: white interferometer, 58: actual measurement information output unit, 60: plasma, 62: correspondence information, 62A: removed-amount arithmetic expression, 62B: groove depth arithmetic expression, 62C: temperature arithmetic expression, 63: correspondence information, 65: filter, 66 pattern, 70: position detection sensor, 72: positional information acquiring unit, 74: design information, 80: groove shape acquiring unit, 82: actual measurement information output unit, 84: actual measurement information, 100: wafer processing system, 200: server, 202: correspondence information generating unit, 204: storage, CH: street, IL: illuminating light, L, L1, L2: laser light, SP: machining spot, and W: wafer

What is claimed is:

1. A laser machining device forming a machined groove along a street on a wafer by relatively moving a laser optical system in a machining feed direction along the street and emitting laser light from the laser optical system to the street, the laser machining device comprising:

an observation image acquiring unit configured to repeatedly acquire an observation image of a machining spot of the laser light emitted from the laser optical system to the street while the machined groove is being formed;

a luminance detector configured to detect a luminance of a plasma generated at the machining spot by emission of the laser light based on the observation image every time the observation image acquiring unit acquires the observation image;

a correspondence information obtaining unit configured to obtain correspondence information indicating a correspondence relationship among the luminance, energy of the laser light and a machined state of the machined groove; and a machined state assessing unit configured to assess the machined state with reference to the correspondence information based on the luminance and known energy of the laser light every time the luminance detector detects the luminance.

2. The laser machining device according to claim 1, wherein the observation image acquiring unit includes:

an optical element configured to block light in a wavelength band of the laser light, and an observation optical system configured to image the machining spot through the optical element.

3. The laser machining device according to claim 1, wherein the correspondence information obtaining unit obtains the correspondence information indicating the correspondence relationship among the luminance, the energy of the laser light, and the machined states including a depth of the machined groove and a temperature at the machining spot.

4. The laser machining device according to claim 1, wherein the laser optical system is configured to form the machined groove selectively under a plurality of machining conditions in which at least one of a depth position of the machining spot from a surface of the wafer and a removed amount of a substance caused by the forming of the machined groove is different, the laser machining device further comprises a machining condition selecting unit configured to select the machining condition, and the correspondence information obtaining unit obtains the correspondence information corresponding to the machining condition selected by the machining condition selecting unit from a plurality of pieces of the correspondence information corresponding to the plurality of machining conditions.

5. The laser machining device according to claim 1, wherein when a plurality of regions having different materials from each other exist along the street, the correspondence information obtaining unit obtains a plurality of pieces of the correspondence information corresponding to the material of each of the regions, the laser machining device further comprises a positional information acquiring unit configured to acquire positional information on the machining spot, and the machined state assessing unit performs assessment of the machined state by using the correspondence information corresponding to the material at a position of the machining spot based on the positional information acquired by the positional information acquiring unit and known design information on the wafer.

6. The laser machining device according to claim 1, further comprising a laser machining controller, while the forming of the machined groove is being performed, the laser machining controller configured to control energy of the laser light emitted from the laser optical system based on a result of assessment by the machined state assessing unit so as to maintain the machined state constant.

7. A wafer processing system, comprising:

one or more laser machining devices according to claim 1, and a server including a storage storing the correspondence information, wherein the correspondence information obtaining unit obtains the correspondence information from the storage.

8. The wafer processing system according to claim 7, wherein at least one of the laser machining devices includes:

a groove shape acquiring unit configured to acquire a groove shape including at least a depth of the machined groove formed at the machining spot for each of the machining spots along the street; and an actual measurement information output unit configured to output actual measurement information on the luminance and the groove shape at each of the machining spots to the server based on a detection result from the luminance detector and an acquisition result from the groove shape acquiring unit, wherein the server includes a correspondence information generating unit configured to generate the correspondence information and store the correspondence information in the storage based on the actual measurement information output from the actual measurement information output unit.

9. A method for controlling a laser machining device configured to form a machined groove along a street on a wafer by relatively moving a laser optical system in a machining feed direction along the street and emitting laser light from the laser optical system to the street, the method comprising:

an observation image acquiring step of repeatedly acquiring an observation image of a machining spot of the laser light emitted from the laser optical system to the street while the machined groove is being formed;

a luminance detecting step of detecting a luminance of a plasma generated at the machining spot by emission of the laser light based on the observation image every time the observation image acquiring step acquires the observation image;

a correspondence information obtaining step of obtaining correspondence information indicating a correspondence relationship among the luminance, energy of the laser light and a machined state of the machined groove; and a machined state assessing step of assessing the machined state with reference to the correspondence information based on the luminance and known energy of the laser light every time the luminance is detected in the luminance detecting step.

* * * * *